United States Patent
Ostby

(10) Patent No.: US 10,127,626 B1
(45) Date of Patent: Nov. 13, 2018

(54) METHOD AND APPARATUS IMPROVING THE EXECUTION OF INSTRUCTIONS BY EXECUTION THREADS IN DATA PROCESSING SYSTEMS

(71) Applicant: ARM Limited, Cambridge (GB)

(72) Inventor: Kenneth Edvard Ostby, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/657,014

(22) Filed: Jul. 21, 2017

(51) Int. Cl.
| G06T 1/00 | (2006.01) |
| G06T 15/00 | (2011.01) |
| G06T 1/20 | (2006.01) |
| G06T 1/60 | (2006.01) |
| G06F 9/30 | (2018.01) |

(52) U.S. Cl.
CPC .............. *G06T 1/20* (2013.01); *G06F 9/3009* (2013.01); *G06T 1/60* (2013.01)

(58) Field of Classification Search
None
See application file for complete search history.

(56) References Cited

U.S. PATENT DOCUMENTS

| 2010/0079454 A1* | 4/2010 | Legakis .................... G06T 1/20 345/423 |
| 2012/0092356 A1* | 4/2012 | Jiao ..................... G06F 12/0223 345/541 |
| 2013/0038620 A1* | 2/2013 | Hakura ..................... G06T 1/20 345/582 |
| 2013/0241941 A1* | 9/2013 | Donaldson .......... G06F 9/44589 345/505 |
| 2014/0092091 A1* | 4/2014 | Li ........................... G06T 17/20 345/423 |
| 2014/0354644 A1* | 12/2014 | Nystad ..................... G06T 1/20 345/426 |
| 2015/0054827 A1* | 2/2015 | Hakura ..................... G06T 1/20 345/423 |

(Continued)

OTHER PUBLICATIONS

Ostby, "Data Processing System," U.S. Appl. No. 15/346,931, filed Nov. 9, 2016.

(Continued)

*Primary Examiner* — Martin Mushambo
(74) *Attorney, Agent, or Firm* — Vierra Magen Marcus LLP

(57) ABSTRACT

In a data processing system, a program to be executed by a programmable processing unit of the data processing system is analyzed to identify a sequence of instructions that would produce the same result for plural execution threads were those plural execution threads each to execute the sequence of instructions using the same input data. Then, when the program is being executed, when an execution thread is to execute the identified sequence of instructions, it is determined whether a result produced by an earlier execution thread executing the sequence of instructions, and that used the same input data, is stored in memory or not. The current thread then either executes the sequence of instructions, or retrieves the stored result produced by the earlier execution of the sequence of instructions and skips execution of the sequence of instructions for which the result is stored, accordingly.

23 Claims, 12 Drawing Sheets

(56) References Cited

U.S. PATENT DOCUMENTS

| | | | |
|---|---|---|---|
| 2015/0091919 A1* | 4/2015 | Nalluri | G06T 1/20 345/522 |
| 2015/0103087 A1* | 4/2015 | Rouet | G06T 15/005 345/582 |
| 2016/0049000 A1* | 2/2016 | Patney | G06T 15/80 345/426 |
| 2016/0349832 A1* | 12/2016 | Jiao | G06F 1/3296 |
| 2017/0024847 A1* | 1/2017 | Engh-Halstvedt | G06T 1/20 |
| 2017/0024848 A1* | 1/2017 | Harris | G06F 9/38 |
| 2017/0032488 A1* | 2/2017 | Nystad | G06T 1/20 |

OTHER PUBLICATIONS

Office Action dated Jun. 6, 2018, in U.S. Appl. No. 15/346,931, filed Nov. 9, 2016.

* cited by examiner

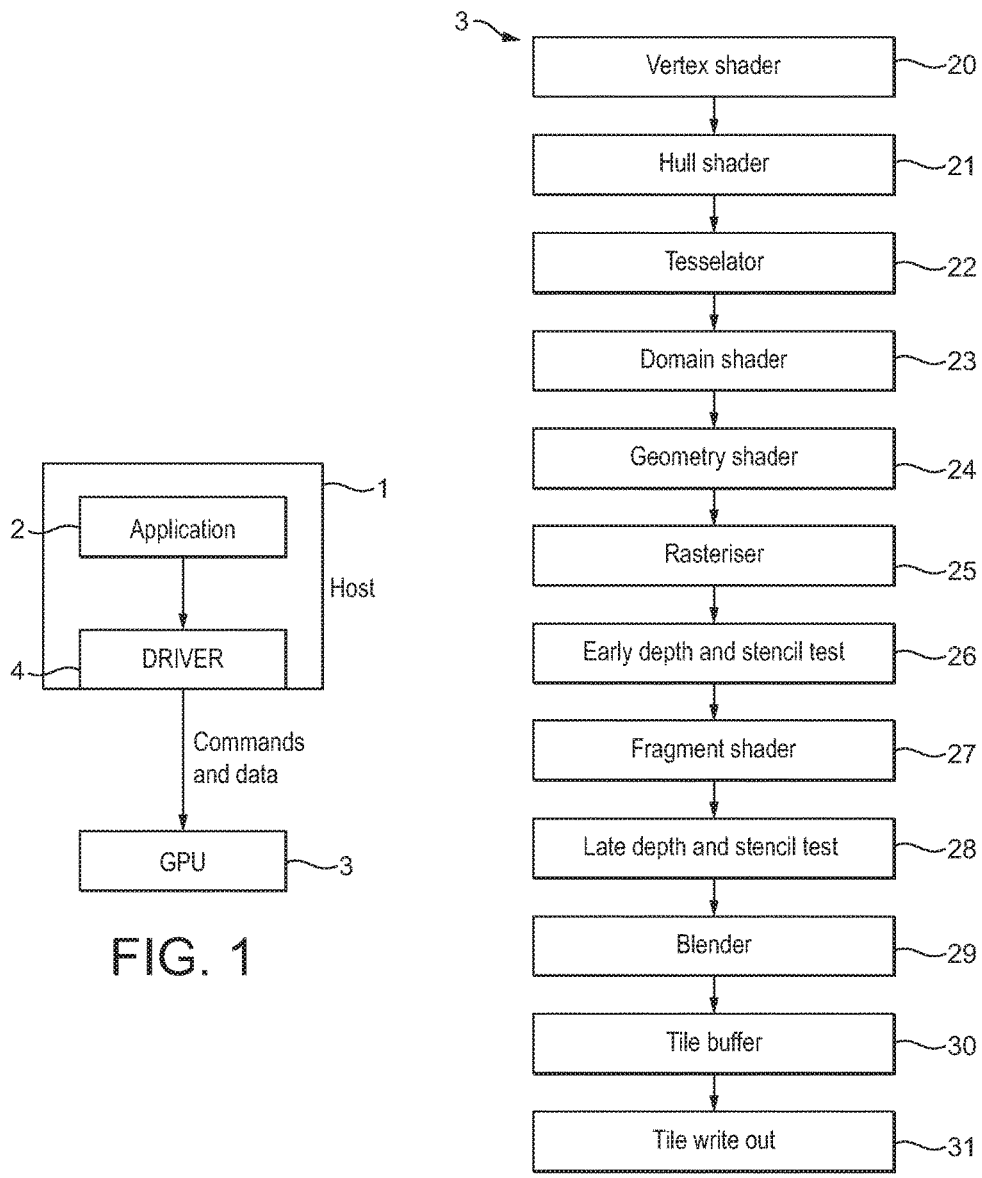

US 10,127,626 B1

METHOD AND APPARATUS IMPROVING THE EXECUTION OF INSTRUCTIONS BY EXECUTION THREADS IN DATA PROCESSING SYSTEMS

BACKGROUND

The technology described herein relates generally to the operation of a data processing system.

Graphics data processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data, for example appropriately shaded and rendered fragment data in the case of a fragment shader, for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated, such as a render target, e.g. frame (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each "item" will be processed by means of an execution thread which will execute the instructions of the shader program in question for the graphics "item" in question.

The Applicants believe that there remains scope for improvements to the execution of instructions by execution threads in data, e.g. graphics, processing systems.

BRIEF DESCRIPTION OF DRAWINGS

A number of embodiments of the technology described herein will now be described by way of example only and with reference to the accompanying drawings, in which:

FIG. 1 shows an exemplary graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
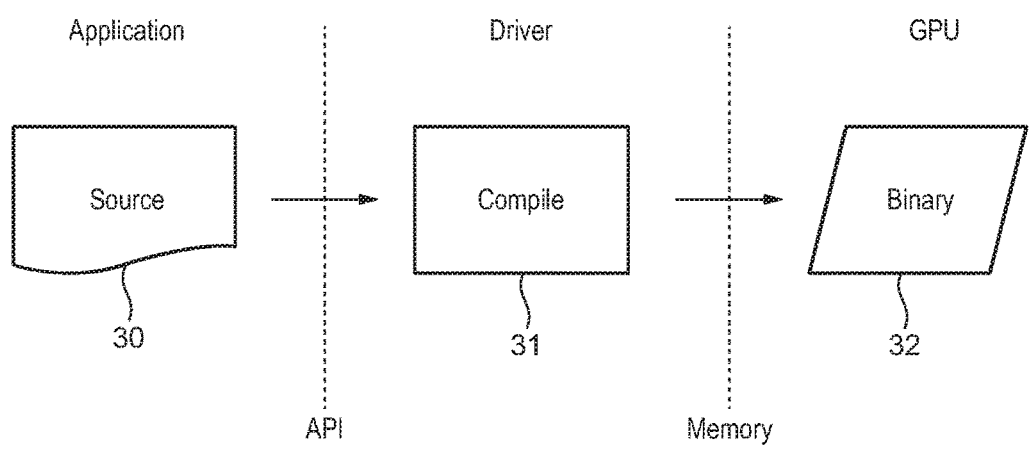
FIG. 3 shows schematically the compiling of a shader program for execution by a graphics processing pipeline.

An embodiment of the technology described herein comprises a method of operating a data processing system which includes a programmable processing stage that executes instructions to perform processing operations, and in which plural execution threads may each execute the same set of instructions;

the method comprising:

for a program comprising a set of instructions for execution by a programmable processing stage of the data processing system:

identifying a sequence of one or more instructions in the set of instructions that would produce the same result for plural execution threads were those plural execution threads each to execute the sequence of one or more instructions using the same input data; and associating with at least one instruction in the identified sequence of one or more instructions an indication that the instruction belongs to a sequence of one or more instructions that would produce the same result for plural execution threads were those plural threads each to execute the sequence of one or more instructions using the same input data;

the method further comprising:

the programmable processing stage:

receiving the set of instructions for execution by the programmable processing stage; and executing the set of instructions for plural execution threads;

the executing the set of instructions for an execution thread comprising:

determining whether an instruction of the set of instructions has associated with it an indication that it belongs to a sequence of one or more instructions that would produce the same result for plural threads were those plural threads each to execute the sequence of one or more instructions using the same input data; and when it is determined that an instruction has associated with it an indication that it belongs to a sequence of one or more instructions that would produce the same result for plural threads were those plural threads each to execute the sequence of one or more instructions using the same input data:

determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and when it is determined that a result produced by an earlier execution of a section of the sequence of instructions, and that used the same input data as the input data which is intended be used when executing the sequence of instructions for the current execution thread, is stored in memory:

not executing the section of the sequence of instructions for which the result is stored for the current thread, and instead retrieving the stored result produced by the earlier execution of that section of the sequence of instructions and continuing execution of the set of instructions for the current thread after the section of the sequence of instructions for which the result is stored using the retrieved stored result.

Another embodiment of the technology described herein comprises a data processing system, comprising:

a programmable processing stage comprising programmable processing circuitry that executes program instructions to perform processing operations, in which execution threads can each execute a set of instructions;

the data processing system further comprising:

processing circuitry configured to, for a program comprising a set of instructions for execution by the programmable processing stage of the data processing system:

identify a sequence of one or more instructions in the set of instructions that would produce the same result for plural execution threads were those plural execution threads each to execute the sequence of one or more instructions using the same input data; and associate with at least one instruction in the identified sequence of one or more instructions an indication that the instruction belongs to a sequence of one or more instructions that would produce the same result for plural execution threads were those plural threads each to execute the sequence of one or more instructions using the same input data;

and the programmable processing stage further comprising processing circuitry configured to:

receive the set of instructions for execution by the programmable processing stage; and execute the set of instructions for plural execution threads;

the executing the set of instructions for an execution thread comprising:

determining whether an instruction of the set of instructions has associated with it an indication that it belongs to a sequence of one or more instructions that would produce the same result for plural threads were those plural threads each to execute the sequence of one or more instructions using the same input data; and when it is determined that an instruction has associated with it an indication that it belongs to a sequence of one or more instructions that would produce the same result for plural threads were those plural threads each to execute the sequence of one or more instructions using the same input data:

determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and when it is determined that a result produced by an earlier execution of a section of the sequence of instructions, and that used the same input data as the input data which is intended be used when executing the sequence of instructions for the current execution thread, is stored in memory:

not executing the section of the sequence of instructions for which the result is stored for the current thread, and instead retrieving the stored result produced by the earlier execution of that section of the sequence of instructions and continuing execution of the set of instructions for the current thread after the section of the sequence of instructions for which the result is stored using the retrieved stored result.

The technology described herein relates to the execution of a set of instructions for a program in which plural threads are to execute the set of instructions. In contrast to conventional arrangements where plural threads each execute the entire set of instructions, in the technology described herein at least one of the threads can, in selected cases, avoid executing a section (which may be all or part of the sequence) of a sequence of one or more instructions of the overall set of instructions by retrieving and using the result produced by an earlier execution (for an earlier thread) of that section of the sequence of instructions. Skipping the execution of a section of the sequence of instructions in this way can, for example, reduce the overall processing that is required by reducing the number of instructions that will be executed by each thread when plural threads are executing the same sequence of instructions.

The Applicants have recognised in this regard that input data to be processed by instructions being executed by a programmable processing stage of a data processing system will often be the same for each of plural threads that are to execute the instructions. For example, in graphics data processing systems, externally provided colour (e.g. RGB), transparency (a), depth, texture co-ordinate, etc., values are often the same for plural threads.

The Applicants have also recognised that some sequences of instructions can produce the same result for plural threads where those plural threads each execute the sequence of instructions using the same input data, and that such sequences of instructions can be identified and indicated in advance.

The technology described herein exploits this by identifying, and then indicating to a programmable processing stage, a sequence of instructions that would produce the same result for plural threads were those plural threads each to execute the sequence of instructions using the same input data.

This indication is then used to trigger the programmable processing stage to determine, for a thread that is currently executing the sequence of instructions, whether the result of a previous execution of the sequence of instructions (or at least a section thereof) by an earlier thread and using the same input data as that which is to be used when executing the instructions for the current thread, is stored in memory or not. Then, when it is determined that a result produced by an earlier execution of the instruction sequence (or at least a section thereof) (and using the same input data) is stored in memory, the programmable processing stage retrieves the stored result from memory, and skips (omits) the execution of the sequence of instructions (or at least a section thereof) for the current thread. As discussed above, this can have the effect of reducing the overall processing that is required by reducing the number of instructions that will be executed when plural threads are to each execute the same set (and sequence(s)) of instructions.

The data processing system can be any desired and suitable system in which plural threads would typically execute the same set of instructions (or at least a part of the set of instructions). In embodiments, the data processing system is a graphics processing system.

Correspondingly, the programmable processing stage can comprise any suitable and desired programmable processing stage of a data processing system. In the case of graphics processing, the programmable processing stage in an embodiment comprises a programmable shading stage (shader). The programmable processing stage may, for example, operate as a programmable geometry shading stage (geometry shader), a programmable vertex shading stage (vertex shader) or a programmable fragment shading stage (fragment shader). It will be appreciated that the programmable processing stage may operate solely as a particular type of processing stage at any given time, but may be able to operate as one or more other types of processing stage at other times (e.g. depending upon how it is programmed).

The technology described herein also extends to the operation of a programmable processing stage of the data processing system on its own (per se).

Thus, another embodiment of the technology described herein comprises a method of operating a programmable processing stage for a data processing system in which plural threads can each execute a set of instructions, the method comprising the programmable processing stage:
receiving a set of instructions for execution; and
executing the set of instructions for plural execution threads;
the executing the set of instructions for an execution thread comprising:
determining whether an instruction of the set of instructions has associated with it an indication that it belongs to a sequence of one or more instructions that would produce the same result for plural threads were those plural threads each to execute the sequence of one or more instructions using the same input data; and
when it is determined that an instruction has associated with it an indication that it belongs to a sequence of one or more instructions that would produce the same result for plural threads were those plural threads each to execute the sequence of one or more instructions using the same input data:
determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and
when it is determined that a result produced by an earlier execution of a section of the sequence of instructions, and that used the same input data as the input data which is intended be used when executing the sequence of instructions for the current execution thread, is stored in memory:
not executing the section of the sequence of instructions for which the result is stored for the current thread, and instead retrieving the stored result produced by the earlier execution of that section of the sequence of instructions and continuing execution of the set of instructions for the current thread after the section of the sequence of instructions for which the result is stored using the retrieved stored result.

Another embodiment of the technology described herein comprises a programmable processing stage for a data processing system, the programmable processing stage comprising processing circuitry configured to:
receive a set of instructions for execution by the programmable processing stage; and
execute the set of instructions for plural execution threads;
the executing the set of instructions for an execution thread comprising:
determining whether an instruction of the set of instructions has associated with it an indication that it belongs to a sequence of one or more instructions that would produce the same result for plural threads were those plural threads each to execute the sequence of one or more instructions using the same input data; and
when it is determined that an instruction has associated with it an indication that it belongs to a sequence of one or more instructions that would produce the same result for plural threads were those plural threads each to execute the sequence of one or more instructions using the same input data:
determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and
when it is determined that a result produced by an earlier execution of a section of the sequence of instructions, and that used the same input data as the input data which is intended be used when executing the sequence of instructions for the current execution thread, is stored in memory:
not executing the section of the sequence of instructions for which the result is stored for the current thread, and instead retrieving the stored result produced by the earlier execution of that section of the sequence of instructions and continuing execution of the set of instructions for the current thread after the section of the sequence of instructions for which the result is stored using the retrieved stored result.

The programmable processing stage can be implemented as desired and in any suitable manner. The programmable processing stage may comprise (be implemented as) any suitable programmable hardware element such as programmable processing circuitry. It in an embodiment comprises (is implemented as) a (programmable) execution unit of the data processor (e.g. graphics processor) in question.

The programmable processing stage can form part of a processing pipeline, such as a graphics processing pipeline. The processing pipeline may comprise plural programmable processing stages. Each programmable processing stage may be provided as a separate circuit element to other programmable stages of a processing pipeline or the programmable processing stages may share some or all of their programmable processing circuitry (that is then differently programmed to serve as the desired programmable processing stage).

As well as any programmable processing stages, the processing pipeline may also contain any other suitable and desired processing stages that a processing pipeline may contain. For example, in the case of graphics processing, the graphics processing pipeline may contain one or more or all of a rasteriser, an early depth (or an early depth and stencil) tester, a late depth (or depth and stencil) tester, a blender, a tile buffer, a write out unit, etc.

The operation in the manner of the technology described herein may be performed by and for each and every program and/or programmable processing stage of the processing pipeline or only for particular categories or types of program or programmable processing stage but not for other categories or types of program or programmable processing stage (e.g. where the type of program or programmable processing stage is unlikely to offer useful opportunities to skip the execution of a (section of a) sequence of instructions for a thread by retrieving the result produced by an earlier execution of that sequence from memory).

The technology described herein may be used where each thread of the plural execution threads is executed independently of other threads of the plural execution threads that are executing the same set of instructions (program) (and in one embodiment this is the case).

It can also be used where execution threads are grouped into "groups" or "bundles" of threads, where the threads of one group are run in lockstep, one instruction at a time. (Other terms used for such thread groups include "warps" and "wavefronts". For convenience, the term "thread group" will be used herein, but this is intended to encompass all equivalent terms and arrangements, unless otherwise indicated.)

Thus in an embodiment, the execution threads executing the program can be (and are in an embodiment) grouped together into thread groups, where the plural threads of a thread group can, and in an embodiment do, each execute the set of instructions in lock-step, one instruction at a time.

Thus a thread to be considered for the technology described herein may be one of plural threads of a larger thread group that is to execute (is executing) the set of instructions. In such arrangements, at least one thread from a (second) thread group could exploit (and use the result produced by) an earlier execution of the sequence of instructions, e.g., and in an embodiment, by a thread or threads of an earlier (a first) thread group.

In such arrangements, the thread groups can be any suitable and desired size. In embodiments, one or more of the thread groups contain four threads (i.e. there is a "warp width" of four). However, other arrangements, such as the use of wider thread groups (warps) would be possible, if desired. In embodiments, each thread group (warp) will correspond to a sampling "item" (e.g. a fragment), such as a 2×2 sampling item ("quad") or other sized sampling item. Thus, the threads of a thread group may relate to respective sample points or sampling positions that are to be subjected to per-sample processing operations.

In embodiments, the programmable processing stage may operate in a manner according to the technology described herein for one or more and in an embodiment for all of the threads of a thread group. In this regard, the Applicants have recognised that it is often the case that the input data is the same for plural threads of a thread group and those threads will produce the same result were those threads each to execute the sequence of instructions for the program. In such cases, all of the threads of a thread group that uses the same input data could retrieve the results produced by an earlier execution of a section of the sequence of instructions (e.g. for a thread of a different thread group) from memory, instead of executing the section of instructions for each thread of the thread group.

Appropriate, e.g., state, information may be maintained to track and indicate which threads of a thread group will retrieve the results of an earlier execution of a section of a sequence of instructions (e.g. for a thread of a different thread group) from memory instead of executing the section of instructions for each thread.

The program that is being executed can be any suitable and desired set of instructions that would typically be executed by plural threads. In embodiments, the program may be a shader program. The program may be, for example, a geometry shader program (a program for executing geometry shading operations), a vertex shader program (a program for executing vertex shading operations) or a fragment shader program (a program for executing fragment shading operations).

Similarly, the set of instructions can be any desired and suitable instructions that would typically be executed by plural threads. The set of instructions may comprise, for example, one or more arithmetic (mathematical) operations (add, subtract, multiply, divide, etc.), bit manipulations (invert, swap, shift, etc.), logic operations (AND, OR, NAND, NOR, NOT, XOR, etc.), load-type instructions (such as varying, texturing or load instructions), store-type instructions (such as blend or store instructions), constants, variables, etc.

The identified sequence of one or more instructions that would produce the same result for plural execution threads where those plural execution threads are each to execute the sequence of one or more instructions using the same input data can comprise any suitable and desired number of instructions.

The one or more instructions in the identified sequence of instructions may comprise any suitable instructions that will use input data and that would produce the same result for plural threads were those plural threads each to execute the one or more instructions using the same input data.

Thus the sequence of instructions may comprise a sequence of arithmetic (mathematical) operations that gives the same result (if the input data is the same), such as a sequence of arithmetic instructions that don't introduce any variables that depend on a variable particular to a thread.

The sequence of instructions may also, e.g., comprise a store-type instruction, such as (and in an embodiment) an external store instruction or instructions, e.g. where each thread stores to (is guaranteed to store to) the same address, and/or a store that does not have any (inappropriate) side-effects (e.g. in the case where the "store" is not to actual memory but controls some hardware behaviour).

Thus, the sequence of instructions may comprise, for example, only one or more arithmetic instructions, or may also comprise only arithmetic instructions and store operations.

The sequence of instructions may also, e.g., comprise a load-type instruction such as (and in an embodiment) an external load instruction where each thread reads (is guaranteed to read) the same address (on the assumption that reading the same address will return the same data) (but this cannot be assumed for loads that read different addresses, as that cannot be guaranteed to provide the same result for the plural threads).

On the other hand, an instruction that is dependent on a variable particular to a thread, such as on the thread group (warp) that the execution thread belongs to or on an execution lane identification number for an execution lane that is being used to execute a particular thread, cannot be considered as producing the same result for plural threads, since it may not provide the same result for the plural threads.

In general, the identified sequence of instructions should, and in an embodiment does, comprise a sequence of instructions that when executed will not affect anything outside of the computational unit that is executing the sequence of instructions (i.e. will not have an effect on the rest of the system).

Identifying the sequence of instructions of the set of instructions can take any desired and suitable form. In embodiments, the program (source code) that is provided, e.g. by an application on a host processor that requires the data processing, is analysed, e.g., and in an embodiment by a compiler (e.g. shader compiler), to determine whether there is a suitable sequence of instructions and, when a suitable sequence of instructions is identified, provide the indication.

Thus, in an embodiment, a compiler for the programmable processing stage:

determines for a program comprising a set of instructions for execution by the programmable processing stage of the data processing system whether the program includes a sequence of one or more instructions in the set of instructions that would produce the same result for plural threads were those plural execution threads each to execute the sequence of one or more instructions using the same input data; and when it is determined that the program includes identifying a sequence of one or more instructions in the set of instructions that would produce the same result for plural threads were those plural execution threads each to execute the sequence of one or more instructions using the same input data:

associates with at least one instruction in the identified sequence of one or more instructions an indication that the instruction belongs to a sequence of one or more instructions that would produce the same result for plural execution threads were those plural threads each to execute the sequence of one or more instructions using the same input data.

In embodiments, the, e.g., compiler may also re-order instructions in the set of instructions so as to, for example, provide a suitable sequence of instructions and/or so as to provide a more efficient (e.g. longer) such sequence of instructions.

The, e.g., compiler, may, e.g., look at the dependencies of instructions in the set of instructions, the results that instructions will generate and the inputs (operands) that they will use, etc., in order to identify suitable sequences of instructions for operation in the manner of the technology described herein. The, e.g., compiler, may use any suitable and desired technique and process in order to identify suitable sequences of instructions in a set of instructions in a program to be executed for operation in the manner of the technology described herein.

The, e.g., compiler, may run on a host processor of the data processing system. The programmable processing stage may form part of another processor, such as a graphics processor, that is associated with the host processor, such that the compiler and compiled program run on separate processors of the overall data graphics processing system. However, other arrangements would be possible, such as the compiler running on the same processor as the compiled program, or the compiler being run on a (completely) separate processor, such as the program being precompiled on a separate system and being distributed in a compiled form.

The technology described herein also extends to the operation of a compiler for the data processing system.

Thus, another embodiment of the technology described herein comprises a method of compiling a program to generate instructions for a programmable processing stage of a data processing system that executes instructions to perform processing operations, and in which execution threads can each execute a set of instructions;

the method comprising:

for a program comprising a set of instructions for execution by a programmable processing stage of the data processing system:

identifying a sequence of one or more instructions in the set of instructions that would produce the same result for plural execution threads were those plural execution threads each to execute the sequence of one or more instructions using the same input data; and associating with at least one instruction in the identified sequence of one or more instructions an indication that the instruction belongs to a sequence of one or more instructions that would produce the same result for plural execution threads were those plural threads each to execute the sequence of one or more instructions using the same input data.

Another embodiment of the technology described herein comprises a compiler that compiles programs to generate instructions for a programmable processing stage of a data processing system that executes instructions to perform processing operations, and in which execution threads can each execute a set of instructions;

wherein the compiler is configured to, when compiling a program to generate a set of instructions for execution by a programmable processing stage of a data processing system:

identify a sequence of one or more instructions in the set of instructions that would produce the same result for plural execution threads were those plural execution threads each to execute the sequence of one or more instructions using the same input data; and associate with at least one instruction in the identified sequence of one or more instructions an indication that the instruction belongs to a sequence of one or more instructions that would produce the same result for plural execution threads were those plural threads each to execute the sequence of one or more instructions using the same input data.

As will be appreciated by those skilled in the art, these embodiments of the technology described herein can, and in an embodiment do, include any one or more or all of the features of the technology described herein, as appropriate.

The indication of the identified sequence of instructions that will use input data and that would produce the same result for plural threads were those plural threads each to execute the sequence of instructions using the same input data can take any desired and suitable form that can indicate (and be used by the programmable processing stage to identify) an instruction that belongs to an identified sequence of one or more instructions and therefore has the potential to be part of a section of the sequence that has been processed by an earlier thread (using the same input data) and has results stored in memory. In other words, the indication can take any desired and suitable form that can indicate (and be used by the programmable processing stage to identify) an opportunity to determine whether a result produced by an earlier execution of a section of the sequence to which the instruction belongs (using the same input data) is stored in memory.

The indication can be provided in any suitable and desired manner. In embodiments, the, e.g. compiler, may, for example, insert an indication instruction or provide a modified version of the identified sequence of instructions at the appropriate point in the set of instructions, or otherwise determine and indicate a particular number of instructions it takes to reach the particular sequence of instructions when executing the set of instructions.

The indication is in an embodiment provided for (so as to identify) (at least) the first instruction in the sequence of instructions, but it could also be provided for other instructions in the sequence as well, if desired.

In embodiments, the indication is provided as or as part of an instruction in the set of instructions. The indication may, for example, be an instruction prior to the identified sequence of one or more instructions, or a modified version of the identified sequence of one or more instructions. For example, and in an embodiment, a flag (bit) may be associated with a (e.g. the first) or each instruction and may be set to provide the indication. In other embodiments, the indication may be a parameter (or parameters) provided separately from the set of instructions (program), such as a pointer (or pointers) to the identified sequence of instructions or a count (or counts) of the number of instructions it takes to reach the (e.g. beginning and/or end of the) identified sequence of instructions when executing the set of instructions (program).

In an embodiment, an indication is also provided so as to identify the last instruction in the sequence of instructions. Such an indication can be provided in a similar manner to the indication for the first instruction in the sequence of instructions.

Thus, in an embodiment, an indication (e.g. a first flag) (bit)) is associated with (only) the first instruction in an identified sequence of instructions (to indicate the beginning of the identified sequence), and an indication (e.g. a second flag (bit)) is associated with (only with) the final instruction in the identified sequence of instructions (to indicate the end of the identified sequence).

It will be appreciated that the set of instructions for the program being executed by the programmable processing stage may comprise more instructions than the sequence of one or more instructions. The one or more instructions in the identified sequence of instructions may be preceded in the set of instructions (for a program) by an instruction that will obtain data from a source that is external to the programmable processing stage, where said data can (and in an embodiment will) be used as input data by the identified sequence of instructions.

It may also be the case that there is more than one sequence of instructions that will produce the same result for plural threads if the input data is the same for each thread in a given set of instructions (program) that is to be executed by plural threads. In this case, in an embodiment plural and in an embodiment each, of such sequences of instructions are identified and indicated for operation in the manner of the technology described herein. Thus, the operation, etc., in the manner of the technology described herein may be repeated for plural identified sequences of instructions comprising one or more particular instructions that will produce the same result for plural threads if that input data is the same for each of the plural threads.

It may also be the case that there may be a sequence or sequences of one or more instructions in the set of instructions to be executed that cannot be guaranteed to produce the same result for plural threads even if the input data is the same (i.e. that could or will produce a different result for each thread, even if the input data is the same).

Such instruction sequences are accordingly in an embodiment executed independently (and completely) for each thread that is to execute the set of instructions.

Thus, in an embodiment, the technology described herein further comprises (and the programmable processing stage processing circuitry is configured to):

when it is determined that an instruction does not have associated with it an indication that the instruction belongs to a sequence of one or more instructions that would produce the same result for plural threads were those plural threads each to execute the sequence of one or more instructions using the same input data:
executing the instruction for the (current) thread.

The next instruction in the set of instructions is in an embodiment then processed in the manner described above, i.e. by determining, for the next instruction, whether the instruction is associated with an indication that the instruction belongs to a sequence of one or more instructions that would produce the same result for plural threads were those plural threads each to execute the sequence of one or more instructions using the same input data, etc., and executing the instruction or not, accordingly, so on, until the end of the set of instructions has been reached.

In an embodiment, instructions that do not belong to sequences of one or more instructions that would produce the same result for plural threads were those plural threads each to execute the sequence of one or more instructions using the same input data are also identified and flagged so as to facilitate control of the operation of the programmable processing stage appropriately when executing such instructions.

Thus, in an embodiment, the method of the technology described herein further comprises (and the data processing system comprises processing circuitry configured to):

for a program comprising a set of instructions for execution by a programmable processing stage of a data processing system:
identifying an instruction in the set of instructions that does not belong to a sequence of one or more instructions that will produce the same result for plural threads were those plural threads each to execute the sequence of instructions using the same input data; and
associating with the instruction an indication that the instruction does not belong to a sequence of one or more instructions that would produce the same result for plural threads were those plural threads each to execute the sequence of instructions using the same input data.

Correspondingly, the determination that an instruction does not have associated with it an indication that the instruction belongs to a sequence of one or more instructions that would produce the same result for plural threads were those plural threads each to execute the sequence of instructions using the same input data may comprise determining that the instruction does have associated with it an indication that the instruction does not belong to a sequence of one or more instructions that would produce the same result for plural threads were those plural threads each to execute the sequence of instructions using the same input data.

The indication for such instructions can be provided as desired, for example in one of the manners discussed above. In an embodiment appropriate metadata is set to indicate such a group of one or more instructions that may not produce the same result for each thread even if the input data is the same.

Thus, in an embodiment metadata, such as a flag, is provided for each instruction in the set of instructions (in the program) to be executed, which can be set to a first, particular, value (e.g. "1") to indicate that the instruction in question belongs to a sequence of one or more instructions that would produce the same result for plural threads were those plural threads each to execute the sequence of instructions using the same input data, and which can be set to a second, different particular, value (e.g. "0") to indicate that the instruction does not belong to a sequence of one or more instructions that would produce the same result for plural threads were those plural threads each to execute the sequence of instructions using the same input data.

This metadata may be recorded, for example, in a table, such as a transaction state table, that comprises an entry for each instruction of the set of instructions.

As mentioned above, when it is determined (for a given thread) that an instruction to be executed is associated with an indication that it belongs to a sequence of one or more instructions that would produce the same result for plural threads were those plural threads each to execute the sequence of instructions using the same input data, it is then determined if a result produced by an earlier execution of a section of the sequence of instructions to which the instruction belongs (and that used the same input data as that which is to be used when executing the sequence of instructions for the current thread) is already stored in memory.

As will be discussed in more detail below, the section of the sequence of instructions for which a result is stored (and used) may comprise the entire (complete) sequence of instructions (all of the instructions in the sequence of instructions), or may be only part but not all of the sequence of instructions (such as a subset of some but not all of the instructions in the sequence of instructions).

The results of (produced by) execution of (a section of) a sequence of instructions can be stored in any suitable and desired memory available to the data processing system. In an embodiment, this data is stored in an appropriate local, and in an embodiment temporary, memory of the system, such as, and in an embodiment, an appropriate cache memory of the data processing system. The results may also be stored in longer term memory (e.g. main (system) memory) for later use, if desired.

It will also accordingly be appreciated here that the determination of whether the result of executing a sequence of instructions is stored in memory that is used to trigger operation in the manner of the technology described herein comprises determining whether the result is stored in, e.g., local, memory that is being used for the purpose of storing the results of the execution of sequence of instructions for use by later threads that may be executing the same sequences of instructions (in contrast, e.g., to any longer term, e.g., main memory, storage of the results of executing a sequence of instructions for other purposes (e.g. for output as part of a graphics processing output being generated by the graphics processing pipeline)).

As will be discussed further below, it in an embodiment comprises determining whether a result produced by an earlier execution of the sequence of instructions by an earlier thread is stored in a portion of memory set aside for storing the results of the execution of sequences of instructions for (potential) use by later threads executing the same sequences of instructions, and in particular, whether the result is stored in a set of stored results for sequences of instructions (an instruction sequence result table) that is being used for the purpose of storing the results of the execution of sequences of instructions so as to make those results available for later threads that are executing the sequences of instructions when those threads are executing the sequences of instructions.

While it would be possible simply to store the result produced by execution of one sequence of instructions, in an embodiment, the data processing system is able to, and, in an embodiment, operates to, store the results for plural different sequences of instructions that would produce the same result for plural threads were those plural threads each to execute the sequence of instructions using the same input data.

Thus, in an embodiment, the system operates to store plural sets of instruction sequence results.

The stored sets of results could, and in an embodiment do, be each for a different sequence of instructions, but it would also be possible to store plural different sets of results for the same sequence of instructions, e.g. that have been generated using different input data, if desired.

Each execution of a sequence of instructions for which a result is stored will have its own entry in the memory where the results for that sequence of instructions are stored. Thus, in an embodiment, the technology described herein stores, in effect, an "instruction sequence results" table, having a plurality of entries, with each entry storing the results for a given execution of a sequence of instructions.

In an embodiment, each entry (i.e. the data that is stored for a sequence of instructions) is stored in a different cache line of a cache that is storing the results of the execution of the sequences of instructions (and is configured so as to occupy no more than a cache line of the cache). This then facilitates, e.g., identifying and accessing the stored results for sequences of instructions, and storing the results for the execution of sequences of instructions, in the cache, using conventional cache access and storage operations.

Each entry for a sequence of instructions in the, e.g. cache, will, as discussed above, store the result of execution of (at least a section of) the sequence of instructions (for a given set of input data (operands)). In an embodiment, and as will be discussed in more detail below, each entry for a sequence of instructions also stores further data.

The determination of whether a result produced by an earlier execution of a (section of a) sequence of instructions is stored in memory can be carried out as desired and in any suitable manner.

In an embodiment, this determination is made, at least in part, by checking whether or not an identifier for the sequence of instructions that the instruction in question belongs to is the same as (matches) an identifier that is associated with any stored instruction sequence results. If the identifier associated with the instruction sequence to be executed matches an identifier associated with a stored instruction sequence result, then that will indicate that a result from executing at least a section of that sequence of instructions is stored in the memory.

Correspondingly, when (if) it is determined that the identifier for the sequence of instructions to be processed by the current thread does not match an identifier associated with a stored instruction sequence result, then that can be taken as an indication that a result from executing at least a section of that sequence of instructions is not stored in memory.

In this latter case, the programmable processing stage accordingly in an embodiment (and is in an embodiment configured to) (simply) executes the sequence of instructions from the beginning (in an embodiment from the instruction in question) for the current thread, in the normal manner.

Thus, in an embodiment, the method of the technology described herein further comprises the programmable processing stage (and the processing circuitry of the programmable processing stage is further configured to):

when it is other than (when it is not) determined that a result produced by the earlier execution of a section of the sequence of instructions, and that used the same input data as the input data which is intended to be used when executing the sequence of instructions for the current execution thread, is stored in memory:

executing the sequence of instructions for the current thread.

To facilitate the above operation, in an embodiment, the (and in an embodiment each) stored set of results produced by executing a sequence of instructions for a thread is stored in association with an identifier for the sequence of instructions in question.

Thus, in an embodiment, each stored instruction sequence result (entry) has associated with it an appropriate identifier for the sequence of instructions in question. Where the results of the execution of the sequences of instructions are stored in a cache, this identifier is in an embodiment provided as, and used as, the "tag" for the cache line that stores the results for the sequence of instructions in question.

The identifier that is used for a sequence of instructions for this purpose can be any suitable and desired identifier for the sequence of instructions. Thus it could, for example, be an identifier that is allocated to the sequence of instructions when the sequence of instructions is identified (and in an embodiment, this is what is done). In this case, the sequences of instructions that are identified in a program could, e.g., be numbered successively so as to identify them.

Alternatively or additionally, the identifier for a sequence of instructions could comprise the position (the program count (PC)) for the first instruction in the sequence of instructions in the set of instructions for the program.

Where an identifier is allocated to a sequence of instructions, then in an embodiment as well as providing an indication that the sequence of instructions is a sequence of instructions that would produce the same result for plural frames were those plural threads each to execute the sequence of instructions using the same input data, the identified sequence of instructions is also associated with its allocated identifier (so that the programmable processing stage can determine the identifier for the sequence of instructions when it recognises the sequence of instructions when executing the program).

It will be appreciated that where a particular identifier (e.g. an identification number) for the instruction to be executed by the current thread is determined to be the same as an identifier that is associated with a stored instruction sequence result, that does not necessarily mean that the stored result can be (correctly) used by the current thread. This is because the result will only be the same (and therefore useable for the current thread) if the input data that was used by the earlier thread when executing the (section of the) sequence of instructions in question is the same as the input data which is to be used by the current thread.

Thus in an embodiment, the determination of whether a result produced by an earlier execution of a section of a sequence of one or more instructions is stored in memory further comprises (e.g. when it is determined that the particular identifier for the instruction sequence in question is the same as an identifier that is associated with a stored instruction sequence result):

determining whether the input data that is to be used when executing the instruction sequence for the current thread is the same as the input data that was used when executing the (section of the) sequence of instructions to generate the stored instruction sequence result.

It can be determined whether the input data that is to be used when executing the instruction sequence for the current thread is the same as the input data that was used when executing the (section of the) sequence of instructions to generate the stored instruction sequence result in any desired and suitable manner.

In an embodiment, the input data that is to be used when executing the instruction sequence for the current thread is compared to the input data that was used when executing the (section of the) sequence of instructions to generate the stored instruction sequence result (and it is determined whether the input data is the same or not, based on the comparison, accordingly).

In this regard, the input data that is to be used when executing the instruction sequence for the current thread may be "internal" to the set (sequence) of instructions that is being executed (e.g. a result generated by a previous instruction in the set of instructions), or, as discussed above, the sequence of instructions may include one or more "external" load instructions, in which case the input data may be data that is to be loaded from an external source.

In the former case, the result data received from the previous instruction (that is to be used as input data for the sequence of instructions) may be appropriately compared to the input data that was used when executing the sequence of instructions to generate the stored instruction sequence result.

In the latter case, the programmable processing stage may, and in an embodiment does, operate to load (e.g. from external memory) the input data that is to be used when executing the instruction sequence for the current thread, and then compares that loaded input data with the input data that was used when executing the sequence of instructions to generate the stored instruction sequence result.

To facilitate this determination, in an embodiment, the results produced by executing (sections of) sequences of instructions are stored in association with information that allows the input data used when executing the sequence of instructions to produce the stored result to be determined. This information could comprise, e.g., an identifier for (e.g. a pointer to) the input data, but in an embodiment, the input data (operand value(s)) itself is stored in association with the instruction sequence result (that that input data was used to generate). Thus, for example, the input data used when executing the sequence of instructions to produce the stored result may be provided as (part of) the "tag" for the entry (cache line) that is storing the instruction sequence result.

Therefore, in embodiments, the programmable processing stage determines (and the programmable processing circuitry is correspondingly configured to determine) whether a result produced by an earlier execution of a section of the sequence of instructions to which the instruction belongs, and that used the same input data as that which is to be used when executing the sequence of instructions for the current thread, is stored in memory, by:

determining whether the input data that is to be used when executing the instruction sequence for the current thread is the same as input data that is stored in association with the result of executing (the section of) the sequence of instructions.

It will be appreciated in this regard that the input data that is stored in association with an instruction sequence result should be, and is in an embodiment, all the input data that is external to the sequence of instructions itself, together with any input data that is internally generated by and within the set of instructions itself). Thus it may, and in an embodiment does, comprise any external data that is to be processed by the first instruction in the sequence. It may also comprise external data that is to be processed by other instructions in the sequence (where that is the case).

In this regard, the Applicants have recognised that where the instructions in the identified sequence of instructions are dependent on (and uses, as input data, the results produced by executing) the preceding instruction, the only input data that will need to be stored together with the results produced for the sequence of instructions is the input data that was used to produce the results of the first instruction in the sequence of instructions. That is, regardless of whether the section of the identified sequence of instructions, for which the results are stored in the instruction sequence table, corresponds to some or all of the identified sequence of instructions, in embodiments the input data that was used to produce the results of the first instruction in the sequence of instructions only is stored in the instruction sequence results table.

When it is determined that the input data to be used for executing the instruction sequence for the current thread is the same as the input data that was used when generating the stored instruction sequence result (e.g. is the same as the input data that is stored in association with the stored instruction sequence result), then that can be taken as an indication that not only has the sequence of instructions already been (or is currently being) executed by an earlier thread, but also that the execution has been (or is being) done for the same input data as that which is to be used to execute the instruction sequence for the current thread. Thus, this can be taken as an indication that a result produced by an earlier execution of a section of the sequence of instructions to which the instruction belongs, and that used the same input data as that which is intended to be used to execute the instruction sequence for the current thread, is stored in memory.

On the other hand, when it is determined that the input data to be used to execute the instruction for the current thread is not the same as the input data that is stored in the instruction sequence table for the sequence of instructions to which the instruction belongs, this can be taken as an indication that the current thread is executing the sequence of instructions using a different set of input data to the result that is stored in memory. That is, this can be taken as an indication that a result produced by an earlier execution of a section of the sequence of instructions to which the instruction belongs, and that used the same input data as that which is intended to be used to execute the sequence of instructions for the current thread, is not stored in memory.

In this latter case, the programmable processing stage accordingly in an embodiment (and is in an embodiment configured to) (simply) executes the sequence of instructions from the beginning (in an embodiment from the instruction in question) for the current thread, in the normal manner.

When it is determined that a result produced by an earlier execution of a section of a sequence of instructions to which an instruction belongs, and that used the same input data as that which is intended to be used to execute the instruction sequence for the current thread, is stored in memory, then, as discussed above, the programmable processing stage will not execute (will skip the execution of) that section of the sequence of instructions, and instead retrieve the result for that section of the sequence of instructions from the memory, and continue execution of the set of instructions (using the retrieved stored result) after the section of instructions for which the result is stored.

The stored result for a (section of a) sequence of instructions can be retrieved using any desired and suitable method, such as conventional cache load operations for the data processing system in question. In an embodiment the input data (operand) fetch operation (stage) that operates to fetch (load) input data for use by an instruction is operable to select as an input, either the "normal" input data (e.g. from the register file) or the previously stored result, as appropriate.

The retrieved stored result may be used in any suitable and desired manner, e.g. depending upon the nature of the stored result and the sequence of instructions being executed. For example, and in an embodiment, the retrieved stored result may be used as an input (as an operand for) later instructions in the sequence of instructions that are being executed and/or for a later or later instructions in the set of instructions that are to be executed after the sequence of instructions in question. Other arrangements would, of course, be possible.

The execution of the set of instructions is in an embodiment continued at (with) the instruction (if there is one) in the set of instructions being executed for the thread that follows the section of instructions for which the result is stored.

To facilitate this, in an embodiment, a (and each) stored instruction sequence result has associated with it an indication of the instruction in the set of instructions that should be executed next if the programmable processing stage is able to use the stored result for a sequence of instructions that it is executing. This will then allow the programmable processing stage to know (or to be able to determine) which instruction should be executed next in the event that it is able to use the stored instruction sequence result.

This "next instruction" indication can be provided in any suitable and desired manner. In an embodiment, an indicator for the next instruction to be executed is stored in memory with the stored instruction sequence result.

Thus, in an embodiment, the programmable processing stage operates to (and the programmable processing circuitry is correspondingly configured to), when a result produced by an earlier execution of a section of a sequence of instructions to which an instruction belongs and that used the same input data as that which is to be used when executing the sequence of instructions for the current thread, is stored in memory, also retrieve from the memory an indicator for the next instruction to be executed in the set of instructions after retrieving the stored result produced by the earlier execution of the section of the sequence of instructions, and determine from the stored indication, the next instruction to be executed in the set of instructions for the current thread, and continue execution of the set of instructions for the current thread at the indicated instruction of the set of instructions.

The indicator could, for example, indicate the latest instruction in the sequence of instructions that has been executed to produce the result that is stored in memory (such that the next instruction to be executed will be the instruction following that indicated instruction). In other embodiments, the identifier indicates the next instruction in the set of instructions to be executed, i.e. the next instruction in the set of instructions that has not been executed.

The next instruction indicator in an embodiment indicates (or allows to be determined) the position of the next instruction in the set of instructions that should be executed. In an embodiment, it is in the form of a program count (PC), e.g., and in an embodiment the program count (PC) of the next instruction to be executed (that the execution should jump to if a thread is able to use the stored result).

Other arrangements would, of course, be possible.

Thus, as will be appreciated from the above, in embodiments of the technology described herein, one or more, and in an embodiment plural, instruction sequence result entries are stored in memory, with each such entry having stored for it, as well as the result of executing (at least a section of) the sequence of instructions, one or more of, and in an embodiment all of:

an identification of the sequence of instructions that the entry relates to;

an indication of the input data (of the operand(s)) used when executing the sequence of instructions to generate the stored result for the sequence of instructions; and an indication of the next instruction to be executed when a thread is able to use the stored result for the (section of the) sequence of instructions.

In an embodiment, a table of instruction sequence results, comprising plural such entries, is maintained.

The programmable processing stage in an embodiment operates to (and accordingly the programmable processing circuitry of the programmable processing stage is in an embodiment configured to) determine from the indication of the next instruction to be executed, the next instruction in the set of instructions to be executed, and proceeds (skips) to that instruction. It will in an embodiment treat that instruction in the same way as in the manner of the technology described herein, and so accordingly determine whether that instruction has an indication that there could be a stored result for executing that instruction available in memory (and if so proceeds accordingly, or if not, simply executes the instruction and then considers the next instruction in the set of instructions accordingly, and so on).

The processing of the next instruction (or sequence of instructions) will use the result retrieved from memory for the preceding section of the sequence of instructions (where required and appropriate).

It may be the case that the next instruction to be executed is a later instruction in the (same) identified sequence of instructions that the result is stored for. In this case, the next instruction will be executed as normal, but using the results retrieved from the memory for the preceding section of the sequence of instructions (e.g., and in an embodiment in the case where the next instruction in the set of instructions is dependent on the preceding instruction in the sequence of instructions).

In other cases, the next instruction to be processed may not belong to the (same) identified sequence of instructions. In this case, the next instruction should be, and is in an embodiment, executed in the overall manner of the technology described above. That is, the next instruction will in an embodiment be processed by first determining whether that instruction has associated with it an indication that it belongs to an identified sequence of instructions that will produce the same result for each of plural threads if executed using the same input data, and then processed accordingly, etc.

As discussed above, when (if) it is determined that that the result produced by an earlier execution of a section of the sequence of instructions to which an instruction belongs, and that used the same input data as that which is intended to be used to execute the instruction for the current thread, is not stored in memory (such that the sequence of instructions can be considered as falling to be executed for the first time for a particular set of input data for the current thread), the programmable processing stage will then execute the sequence of instructions from the beginning of the sequence, starting with the instruction in question.

Thus in an embodiment of the technology described herein, the programmable processing stage operates to (and is configured to):

when it is determined that a result produced by an earlier execution of a section of the sequence of instructions to which the instruction belongs, and that used the same input data as that which is intended to be used when executing the sequence of instructions for the current thread, is not stored in memory (is other than stored in memory):

execute the sequence of instructions for the current thread using the input data which is intended to be used to execute the sequence of instructions for that thread.

In this case, once all of the instructions in the sequence of instructions have been executed for the thread, the execution will proceed to process the next instruction in the set of instructions (if present) in the overall manner of the technology described herein, i.e. by determining whether the (next) instruction has associated with it an indication that it belongs to an identified sequence of instructions (i.e. a different sequence of one or more instructions) and so on, or will end if the final instruction in the sequence corresponds to the end of the set of instructions for the program.

As well as executing the sequence of instructions when it is determined that the result produced by the earlier execution of (at least a section of) the sequence of instructions using the same input data is not stored in memory, in an embodiment the execution thread that is currently executing the sequence of instructions operates to store the results produced by executing the identified sequence of instructions in memory (so that the results produced by the executing of the identified sequence of instructions by the current thread can then be retrieved and reused by later threads when (if) the same sequence of instructions falls to be executed subsequently by another thread or threads).

Thus, in an embodiment, the programmable processing stage operates to (and the processing circuitry of the programmable processing stage is configured to):

when it is other than (when it is not) determined that a result produced by earlier execution of a section of the sequence of instructions, and that used the same input data as the input data which is intended to be used when executing the sequence of instructions for the current execution thread, is stored in memory:

executing the sequence of instructions for the current thread and storing the result produced by the execution of at least a section of the sequence of instructions in memory so as to be available for use by later threads that execute the same sequence of instructions.

Correspondingly, another embodiment of the technology described herein comprises a method of operating a data processing system which includes a programmable processing stage that executes instructions to perform processing operations, and in which plural execution threads may each execute the same set of instructions;

the method comprising:

for a program comprising a set of instructions for execution by a programmable processing stage of the data processing system:

identifying a sequence of one or more instructions in the set of instructions that would produce the same result for plural execution threads were those plural execution threads each to execute the sequence of one or more instructions using the same input data; and associating with at least one instruction in the identified sequence of one or more instructions an indication that the instruction belongs to a sequence of one or more instructions that would produce the same result for plural execution threads were those plural threads each to execute the sequence of one or more instructions using the same input data;

the method further comprising:
the programmable processing stage:
receiving the set of instructions for execution by the programmable processing stage; and
executing the set of instructions for plural execution threads;
the executing the set of instructions for an execution thread comprising:
determining whether an instruction of the set of instructions has associated with it an indication that it belongs to a sequence of one or more instructions that would produce the same result for plural threads were those plural threads each to execute the sequence of one or more instructions using the same input data; and
when it is determined that an instruction has associated with it an indication that it belongs to a sequence of one or more instructions that would produce the same result for plural threads were those plural threads each to execute the sequence of one or more instructions using the same input data:
determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and
when it is not determined that a result produced by an earlier execution of a section of the sequence of instructions, and that used the same input data as the input data which is intended be used when executing the sequence of instructions for the current execution thread, is stored in memory:
executing the sequence of instructions for the current thread and storing the result produced by the execution of at least a section of the sequence of instructions in memory so as to be available for use by later threads that execute the same sequence of instructions.

Another embodiment of the technology described herein comprises a data processing system, comprising:
a programmable processing stage comprising programmable processing circuitry that executes program instructions to perform processing operations, in which execution threads can each execute a set of instructions;
the data processing system further comprising:
processing circuitry configured to, for a program comprising a set of instructions for execution by the programmable processing stage of the data processing system:
identify a sequence of one or more instructions in the set of instructions that would produce the same result for plural execution threads were those plural execution threads each to execute the sequence of one or more instructions using the same input data; and
associate with at least one instruction in the identified sequence of one or more instructions an indication that the instruction belongs to a sequence of one or more instructions that would produce the same result for plural execution threads were those plural execution threads each to execute the sequence of one or more instructions using the same input data;
and the programmable processing stage further comprising processing circuitry configured to:
receive the set of instructions for execution by the programmable processing stage; and
execute the set of instructions for plural execution threads;
the executing the set of instructions for an execution thread comprising:
determining whether an instruction of the set of instructions has associated with it
an indication that it belongs to a sequence of one or more instructions that would produce the same result for plural threads were those plural threads each to execute the sequence of one or more instructions using the same input data; and
when it is determined that an instruction has associated with it an indication that it belongs to a sequence of one or more instructions that would produce the same result for plural threads were those plural threads each to execute the sequence of one or more instructions using the same input data:
determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and
when it is not determined that a result produced by an earlier execution of a section of the sequence of instructions, and that used the same input data as the input data which is intended be used when executing the sequence of instructions for the current execution thread, is stored in memory:
executing the sequence of instructions for the current thread and storing the result produced by the execution of at least a section of the sequence of instructions in memory so as to be available for use by later threads that execute the same sequence of instructions.

Thus, another embodiment of the technology described herein comprises a method of operating a programmable processing stage for a data processing system in which plural threads can each execute a set of instructions, the method comprising the programmable processing stage:
receiving a set of instructions for execution; and
executing the set of instructions for plural execution threads;
the executing the set of instructions for an execution thread comprising:
determining whether an instruction of the set of instructions has associated with it an indication that it belongs to a sequence of one or more instructions that would produce the same result for plural threads were those plural threads each to execute the sequence of one or more instructions using the same input data; and
when it is determined that an instruction has associated with it an indication that it belongs to a sequence of one or more instructions that would produce the same result for plural threads were those plural threads each to execute the sequence of one or more instructions using the same input data:
determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and
when it is not determined that a result produced by an earlier execution of a section of the sequence of instructions, and that used the same input data as the input data which is intended be used when executing the sequence of instructions for the current execution thread, is stored in memory:

executing the sequence of instructions for the current thread and storing the result produced by the execution of at least a section of the sequence of instructions in memory so as to be available for use by later threads that execute the same sequence of instructions.

Another embodiment of the technology described herein comprises a programmable processing stage for a data processing system, the programmable processing stage comprising processing circuitry configured to:

receive a set of instructions for execution by the programmable processing stage; and execute the set of instructions for plural execution threads;

the executing the set of instructions for an execution thread comprising:

determining whether an instruction of the set of instructions has associated with it an indication that it belongs to a sequence of one or more instructions that would produce the same result for plural threads were those plural threads each to execute the sequence of one or more instructions using the same input data; and when it is determined that an instruction has associated with it an indication that it belongs to a sequence of one or more instructions that would produce the same result for plural threads were those plural threads each to execute the sequence of one or more instructions using the same input data:

determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and when it is not determined that a result produced by an earlier execution of a section of the sequence of instructions, and that used the same input data as the input data which is intended be used when executing the sequence of instructions for the current execution thread, is stored in memory:

executing the sequence of instructions for the current thread and storing the result produced by the execution of at least a section of the sequence of instructions in memory so as to be available for use by later threads that execute the same sequence of instructions.

As discussed above, in an embodiment, the result of executing (at least a section of) the sequence of instructions is stored in memory in association with further data, such as, and in an embodiment, one or more of, and in an embodiment all of:

an identifier for the sequence of instructions;

the input data that was used to generate the stored result(s); and the next instruction in the set of instructions to be executed when using the stored result.

In an embodiment, the operation of storing the result of the execution of a sequence of instructions in memory also involves first determining whether there is an available entry (space) in memory for storing the result of the execution of the sequence of instructions (e.g., and in an embodiment, whether there is an available entry in a set of instruction sequence result entries (table)). In the case where the instruction sequence results are stored in a cache, this may, and in an embodiment does, comprise determining whether there is an available cache line for storing the instruction sequence result. This can, and in an embodiment does, use the arrangements for cache line allocation in the data processing system in question, such as an appropriate least recently used (LRU) process.

When an available entry, e.g. in the instruction sequence table, has been identified, that entry is in an embodiment then associated with the sequence of instructions to be (being) executed by the current thread. This can be done, as mentioned above, for example, and in an embodiment, by storing an indication of the first instruction in the sequence of instructions in the entry (tagging the cache line with the identity of the first instruction in the sequence). The input data to be used to execute the first instruction in the sequence can also be (and in an embodiment is also) stored in the stored result entry (e.g. cache line).

When there is space (an available entry) in memory for storing the results of the execution of a sequence of instructions, the programmable processing stage will then operate to execute the sequence of instructions and when it does so, will store the results of executing the sequence of instruction in memory (in the stored entry for that sequence of instructions).

It would be possible in this regard for the programmable processing stage to wait until it has completed all the instructions in the identified sequence of instructions and then store the result for the sequence as a whole (once the sequence has been completed (and in an embodiment, this is what is done)).

However, in an embodiment, the programmable processing stage is operable to store the result (if any) generated after execution of each instruction in the sequence of instructions, i.e. as instructions in the sequence are executed.

In this case therefore, the programmable processing stage will execute each instruction in the identified sequence of instructions in turn, and store the results produced for each instruction in the entry for the sequence of instructions. In this case, the result produced by executing an instruction in the sequence of instructions could be stored in addition to the result produced by executing other instructions in the sequence of instructions. However, in embodiments, such as in cases where the instructions in the sequence are dependent on each other, a result produced by executing a later instruction in the sequence replaces the result produced by executing a (the) previous instruction in the sequence of instructions, such that only the most recently produced result is stored in the memory.

As well as storing the result for executing the sequence of instructions (i.e. after completion of the sequence of instructions, or after execution of each instruction in the sequence), the programmable processing stage in an embodiment operates to, each time a result is stored in memory, also store in association with that result (in the appropriate instruction sequence result entry) the indication (e.g. identifier) of the next instruction in the set of instructions to be executed.

In this case therefore, in an arrangement where a new result is stored each time an instruction in a sequence of instructions has been executed, the identifier of the next instruction of the set of instructions to be executed is correspondingly in an embodiment updated after each instruction in the sequence of instructions is executed. Thus, the programmable processing stage is in an embodiment configured to, and operates to, each time an instruction of the sequence of instructions has been executed, update the stored instruction sequence result entry with an identifier for the next instruction in the set of instructions to be executed.

Thus, in an embodiment, a stored instruction sequence results entry is updated as instructions in the sequence are executed, so as to, in essence, keep a running track of the result and position in the sequence of instructions that has been reached by the thread that is executing the sequence of instructions.

In arrangements where the relevant stored instruction sequence result is updated after each instruction in a sequence of instructions is executed, then it would be possible for later threads that are to execute the same sequence of instructions to use the result of the previous thread that is executing the sequence of instructions at the point that that previous thread has reached in the sequence of instructions (even if the previous thread has not yet completed the sequence of instructions) (because the result for the instructions of the sequence of instructions that the earlier thread has executed will be available in memory). In this case therefore, a later thread may, e.g., and in an embodiment, use the result of execution of only some but not all of an identified sequence of instructions by an earlier thread so as to reduce its processing of the sequence of instructions.

In this case therefore, at the time the later thread starts to execute the sequence of instructions, the memory will store a result produced by an earlier execution by a previous execution thread of a section of the sequence of instructions that comprises only some but not all of the sequence of instructions. In other words, in these arrangements, and accordingly in embodiments of the technology described herein, a section of a sequence of instructions for which a result can be stored in (and used from) memory may comprise some but not all of the instruction sequence in question.

In this case, a later thread may be able to skip, e.g., a first part of a sequence of instructions by using the result produced for that first part of the sequence of instructions by an earlier thread, but may then execute (and in an embodiment does execute) the remaining part of the sequence of instructions that had not yet been executed by the earlier thread when the current thread began its execution of the sequence of instructions. In this case therefore, the current thread will then continue executing instructions in the sequence of instructions that have not yet been executed by the earlier thread.

Thus, in an embodiment, the method of the technology described herein comprises the programmable processing stage (and the processing circuitry of the programmable processing stage is configured to):

when it is determined that a result produced by an earlier execution of a section of the sequence of instructions, and that used the same input data as the input data which is intended to be used when executing the sequence of instructions for the current execution thread, is stored in memory:

not executing the section of the sequence of instructions for which the result is stored for the current thread, and instead retrieving the stored result produced by the earlier execution of that section of the sequence of instructions, and continuing execution of further instructions in the sequence of instructions after the section of the sequence of instructions for which the result is stored, using the retrieved stored result.

In this case, the later thread could also store the results it generates for the later part of the sequence of instructions (that the earlier thread has not yet executed), but in an embodiment does not do so (because the earlier thread will already be set to store the results of the later instructions in the sequence in memory). Thus, in an embodiment, the current (later) thread executes any remaining instructions in the sequence of instructions independently of the earlier thread which is currently executing the same sequence of instructions (for the same input data), but without updating or storing any entry for that sequence of instructions in the memory.

In the above arrangements, the programmable processing stage is able to retrieve the result produced for a section of a sequence of instructions in cases when at least some of the instruction sequence has been executed for an earlier thread.

However, the Applicants have recognised that it may be desirable for the programmable processing stage to retrieve the results produced by the earlier execution of a sequence of instructions only when the execution of the sequence of instructions for the earlier thread has completely finished (such that the result produced for the entire sequence of instructions is stored in the memory).

This may allow situations where parts of an identified sequence of instructions are processed separately by plural threads (for the same input data) to be reduced or avoided, thereby reducing the processing burden on the data processing system.

In this case therefore the section of the sequence of instructions for which it is determined whether a result is stored in (and used from) memory will comprise the entire (the complete) sequence of instructions. In other words, it will be determined whether a result produced by an earlier execution by a previous execution thread of all of the sequence of instructions to which the instruction belongs and that used the same input data as the input data which is intended to be used when executing the sequence of instructions for the current execution thread, is stored in memory (with the operation then proceeding accordingly).

Thus in an embodiment, the determination as to whether a result produced by an earlier execution of a section of the sequence of one or more instructions to which the instruction belongs, and that used the same input data as that which is intended to be used to execute the instruction sequence for the current thread, is stored in memory comprises:

determining whether a result produced by an earlier execution of the entire sequence of one or more instructions to which the instruction belongs, and that used the same input data as that which is intended to be used to execute the instruction for the current thread, is stored in memory.

In this case therefore, before using a stored instruction sequence result, as well as checking whether or not a particular identifier for the instruction in question is the same as an identifier that is associated with any stored instruction sequence results, and whether the input data that is intended to be used to execute the instruction sequence for the current thread is the same as the input data that was used (or is being used) to generate the stored instruction sequence result in question, it will also be checked:

whether the stored instruction sequence result is for the execution of the entire sequence of one or more instructions or not (i.e. whether the earlier thread that is generating the stored instruction sequence result has completed its execution of the entire sequence of instructions (of all the instructions in the sequence) or not.

When it is determined that the stored instruction sequence result is for the entire sequence of instructions, then the programmable processing stage will not execute the identified sequence of instructions for the current thread, and instead retrieve the result produced by the earlier execution of the (entirety of the) identified sequence of instructions from memory, and continue execution of the set of instructions after the identified sequence of instructions, using the retrieved result.

The determination of whether a stored instruction sequence result is for a complete sequence of one or more instructions can be done in any suitable and desired way.

In an embodiment, a (and each) stored instruction sequence result has associated with it an indication of whether it is for a complete sequence of one or more instructions or not. Such an indication can be provided in any suitable and desired manner. For example, in the case where the instruction sequence results are stored in a cache memory, the cache line that is storing the result for a given instruction sequence could, e.g., be indicated as being locked (and/or as not containing valid data) whilst a thread is executing the instruction sequence and storing instruction sequence results in the cache line, and then indicated as being unlocked (as containing valid data) once the execution thread that is storing the instruction sequence results in the cache line has completed execution of the complete sequence of instructions. Later threads could then (and do then) determine whether the cache line that is storing the results for the instruction sequence in question is locked or unlocked (is indicated as being valid or not), and then proceed accordingly.

Other arrangements, such as providing a "complete" indicator (e.g. flag) with each stored instruction sequence result, that can be set to a first, particular, value (e.g. "1") to indicate that the entry in question is for a complete sequence of instructions, and which can be set to a second, different particular, value (e.g. "0") to indicate that the entry in question is not for a complete sequence of instructions, could be used if desired.

Thus, in an embodiment, the determination is made by checking whether or not the stored instruction sequence result that corresponds to the earlier execution of the identified sequence of instructions (using the same input data) is indicated (e.g. flagged) as being for the complete sequence of instructions or not.

Thus, in embodiments of the technology described herein, when it is determined, as described above, that the result of executing a sequence of instructions is to be stored in the memory, the programmable processing stage will also associate with its stored result in the memory, an indication as to whether the stored instruction sequence result is for the complete sequence of one or more instructions or not.

Correspondingly, executing the identified sequence of instructions will in this case comprise: the programmable processing stage initially associating the result of executing the sequence of instructions that it is storing in memory with an indication that the stored result is not for the complete sequence of instructions, executing the instructions in the sequence of instructions in turn, and after executing the final instruction of the sequence of instructions (and storing the results produced thereby in the memory), associating the stored instruction sequence result with an indication that the stored instruction sequence result is for the complete sequence of instructions.

It would be possible in these arrangements for a later thread to only use the stored result for an entire sequence of instructions when it is determined at the time that the later thread is to start execution of the sequence of instructions that a result for the entire sequence of instructions (from an earlier thread) is already stored in the memory. In this case therefore, when it is determined that the stored instruction sequence result entry is for the complete sequence of instructions, the later thread will retrieve the stored result and skip the execution of the (entire) sequence of instructions and, correspondingly, when it is determined that there is no stored result for the complete sequence of instructions in the memory, the later thread will simply execute the sequence of instructions itself, from the beginning.

However, in an embodiment, the programmable processing stage is operable to (and operates to) determine whether an earlier thread is in the process of executing the sequence of instructions at the time that the later thread is to start execution of the sequence of instructions (i.e. that an instruction sequence result is in the process of being generated and stored in the memory by an earlier thread but that earlier thread has not yet executed (finished executing) the complete sequence of instructions), and when it is determined that an earlier thread is in the process of executing the sequence of instructions, but has not yet stored the result for the entire sequence of instructions in the memory, the current thread does not itself execute the sequence of instructions, but instead awaits the completion of the execution of the sequence of instructions by the earlier thread, and then when the earlier thread has completed the execution of the complete sequence of instructions, the current thread reads the stored result from the memory and proceeds accordingly (i.e. skips, and does not execute itself, the sequence of instructions, but instead uses the result stored in the memory by the earlier thread).

The situation where the result for a sequence of instructions is in the process of being generated and stored in memory by an earlier thread, but the result for the complete sequence of instructions has not yet been stored in the memory by the earlier thread, can be recognised in any appropriate and desired manner. In an embodiment it is done by the programmable processing stage recognising that there is a stored result entry allocated (set aside) in the memory for the sequence of instructions (and using the same input data), but which is not yet indicated as being for the complete sequence of instructions. Thus, for example, and in an embodiment, the programmable processing stage could recognise that a cache line has been allocated for storing the result of the sequence of instructions, but does not yet contain valid data (e.g. is locked by an earlier execution thread), and then determine that the earlier execution of the sequence of instructions has been completed when the cache line storing the result is indicated as containing valid data (has been unlocked).

Other arrangements would, of course, be possible.

In these arrangements, it should, and is in an embodiment, at least determined whether there is an instruction sequence result being generated by an earlier thread for the sequence of instructions in question. So far as whether that result is using the same input data as the current (new) thread is concerned or not, that is in an embodiment also checked at the initial stage (when it is first checked whether a stored instruction sequence result is in the progress of being stored in the memory for the instruction sequence in question) (as that will then allow the later thread to continue its execution immediately if the input data is not the same) (but this could also be checked after the earlier thread has completed its execution of the entire sequence of instructions, if desired).

In these embodiments, when a later execution thread determines that an earlier execution thread is in the process of executing the sequence of instructions in question but has not yet completed its execution of the entire sequence of instructions, then in an embodiment, the execution of the sequence of instructions by the current thread (and so the retrieval of the stored instruction sequence result by the current thread) is stalled (delayed) until the entire sequence of instructions has been executed by the earlier thread (and thus the instruction sequence result for the complete sequence of instructions has been stored in the memory).

This can be done, for example, and in an embodiment, by placing the current thread in a list (queue) of waiting (stalled) threads until the earlier thread has completed its execution of the sequence of instructions.

In an embodiment plural execution threads may be awaiting (queued for) a given instruction sequence result at the same time, e.g. in arrangements where an identified sequence of instructions is to be executed (using the same input data) for three or more thread(s).

Correspondingly, in an embodiment, execution threads may be awaiting (and queued for) plural different instruction sequences that are being executed by an earlier thread or threads.

The list(s) (queue(s)) of threads awaiting completion of a sequence of instructions by an earlier thread or threads can be implemented as desired, e.g. as a FIFO queue(s), a linked-list(s), or in any other suitable (e.g. implementation dependent) form.

In these arrangements, threads that are awaiting the completion of a sequence of instructions by an earlier thread can be reactivated (released from the queue) in any suitable and desired manner. For example, it could be periodically checked whether the processing of the sequence of instructions has been completed by the earlier thread, and then when it is determined that the processing of the sequence of instructions has been completed by the earlier thread, the execution of the set of instructions by any stalled threads awaiting that instruction sequence result is restarted (continued). Additionally or alternatively, the completion of the execution of the sequence of instructions by the earlier thread could be signalled appropriately to the system when the earlier thread completes its execution of the sequence of instructions, with that signal then being taken as a trigger, e.g., to "replay" the stalled threads awaiting the instruction sequence result from the earlier thread.

In an embodiment, each instruction sequence result entry is allocated an identifier (e.g. in the numerical sequence of the entries as they are stored), and then each queue that is storing threads awaiting the completion of an instruction sequence result entry is associated with the identifier for the instruction sequence result entry that it is the queue for. Then, when a thread is awaiting an instruction sequence result entry to be completed, the thread is added to the corresponding queue for that instruction sequence result entry, and when the earlier thread that is executing the sequence of instructions in question completes the execution of the sequence of instructions (unlocks the instruction sequence result entry), all of the threads that are in the queue corresponding to that instruction sequence result entry (which a queue can be identified from the instruction sequence result entry identifier) are then replayed.

Other arrangements would, of course, be possible.

In these arrangements, the threads placed in a queue (list) are in an embodiment processed in the order that they were placed in the queue (after it is determined that the results stored in the memory is for the entire sequence of one or more instructions).

The technology described herein can be used for all forms of output that a data processing system, e.g. pipeline, may be used to generate. For example, in the case of graphics processing, the graphics processing system (pipeline) may generate frames for display, render-to-texture outputs, etc. The output, e.g. fragment shaded, data values from the processing are in an embodiment exported to external, e.g. main, memory, for storage and use, such as to a frame buffer for a display.

Thus the graphics processing system should (and in an embodiment does) produce some useful output data, e.g. graphics processing output data for use in (subsequent) graphics processing operations etc. In an embodiment, the generated output data is used to provide an image for display, e.g. is provided to a display for display.

In some embodiments, the data processing system comprises, and/or is in communication with, one or more memories and/or memory devices that store the data described herein, and/or store software for performing the processes described herein. The data processing system may also comprise or be in communication with a host microprocessor, and/or with a display for displaying images based on the data generated by the data processing system.

The technology described herein is applicable to any suitable form or configuration of processor or data processing system. It is particularly applicable to tile-based graphics processors and graphics processing systems. Thus in an embodiment, the data processing system and processing pipeline are a tile-based graphics processing system and pipeline, respectively.

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

The embodiments illustrated by the drawings will be described in the context of the processing of computer graphics for display. However, it will be appreciated that the techniques for handling execution threads described herein can be used in other non-graphics contexts in which plural execution threads are each to execute the same set of instructions (program), and can (potentially) each use the same input data when doing so.

FIG. 1 shows a typical graphics processing system. An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application.

FIG. 3 illustrates this, and shows the shader program being provided in the high level shader programming language 30 by the application 2 to the driver 4, which then compiles 31 the shader program to the binary code 32 for the graphics processing pipeline 3.

As discussed above, each shader in the graphics processing pipeline is a processing unit that performs graphics processing by running small programs for each graphics item in a graphics output to be generated (an "item" in this regard is usually a vertex, a fragment or a pixel), and is implemented as appropriate programmable processing circuitry. The present embodiments relate to the situation where plural threads are to be executed by a shader, where each thread corresponds to one graphics item.

Embodiments of the technology described herein will now be described with reference in particular to operations of the fragment shader 27 of the graphics processing pipeline. However, the following processes could be appropriately modified and used by any one or more or all of the programmable processing stages.

In the fragment shader 27, the fragment shading program that is being executed is run once for each sampling position (or point) that is to be processed, with one execution thread being spawned for each sampling position. The sampling positions (and thus accordingly their corresponding execution threads) can be processed individually, but are typically organised into and processed as groups of plural sampling positions (and thus threads). In the present embodiments, the sampling positions are organised into 2×2 "quads", and are correspondingly processed in the fragment shader as thread groups or "warps" containing four threads, each corresponding to one of the sampling positions of the "quad". The group of threads representing a given sampling position quad is then run in lockstep, one instruction at a time, through the fragment shader.

In the present embodiments, a shader program (set of instructions) to be executed is analysed to identify a sequence of one or more instructions that will produce the same result for plural threads if the input data is the same for each thread. At least the first instruction of the identified sequence of instructions is then flagged as belonging to a sequence of instructions that will produce the same result for plural threads if the input data is the same for the plural threads.

In the present embodiments, the flag that indicates whether an instruction belongs to a sequence of instructions that will produce the same result if the input data is the same for plural threads or not, will be set for an instruction if it belongs to a sequence of instructions that will produce the same result if the input data is the same for plural threads, or cleared if the instruction belongs to a sequence of instructions that may not produce the same result even if the input data is the same for plural threads.

Once the shader program has been prepared in this way, then when it is being executed by the shader in question, each time there is an instruction in the shader program that is indicated as belonging to a sequence of instructions that will produce the same result if the input data is the same for plural threads, it is determined whether the result produced by an earlier execution of a section of the sequence to which the instruction belongs, and that used the same input data as that which is intended to be used by the current thread, is stored in memory or not.

In the event that the instruction is indicated as belonging to a sequence of instructions that will produce the same result if the input data is the same for plural threads, and it is determined that the results produced by an earlier execution of a section of the sequence to which the instruction belongs, and that used the same input data as that which is intended to be used by the current thread, is stored in memory, then the instructions in that section of the sequence of instructions are omitted from being executed, and the result produced by the earlier execution of that section of the sequence of instructions is fetched from the memory and used instead.

On the other hand, if the instruction is not indicated as belonging to a sequence of instructions that will produce the same result if the input data is the same for plural threads, or it is determined that the results produced by an earlier execution of a section of the sequence to which the instruction belongs, and that used the same input data as that which is intended to be used by the current thread, is not stored in memory, then each instruction in the sequence of instructions to which the instruction belongs is executed for the thread in question (in the normal manner). Furthermore, if the instruction was indicated as belonging to a sequence of instructions that will produce the same result if the input data is the same for plural threads, the result of the execution of the sequence of instructions by the thread is also stored in memory for (potential) use by other threads.

Figure 4:
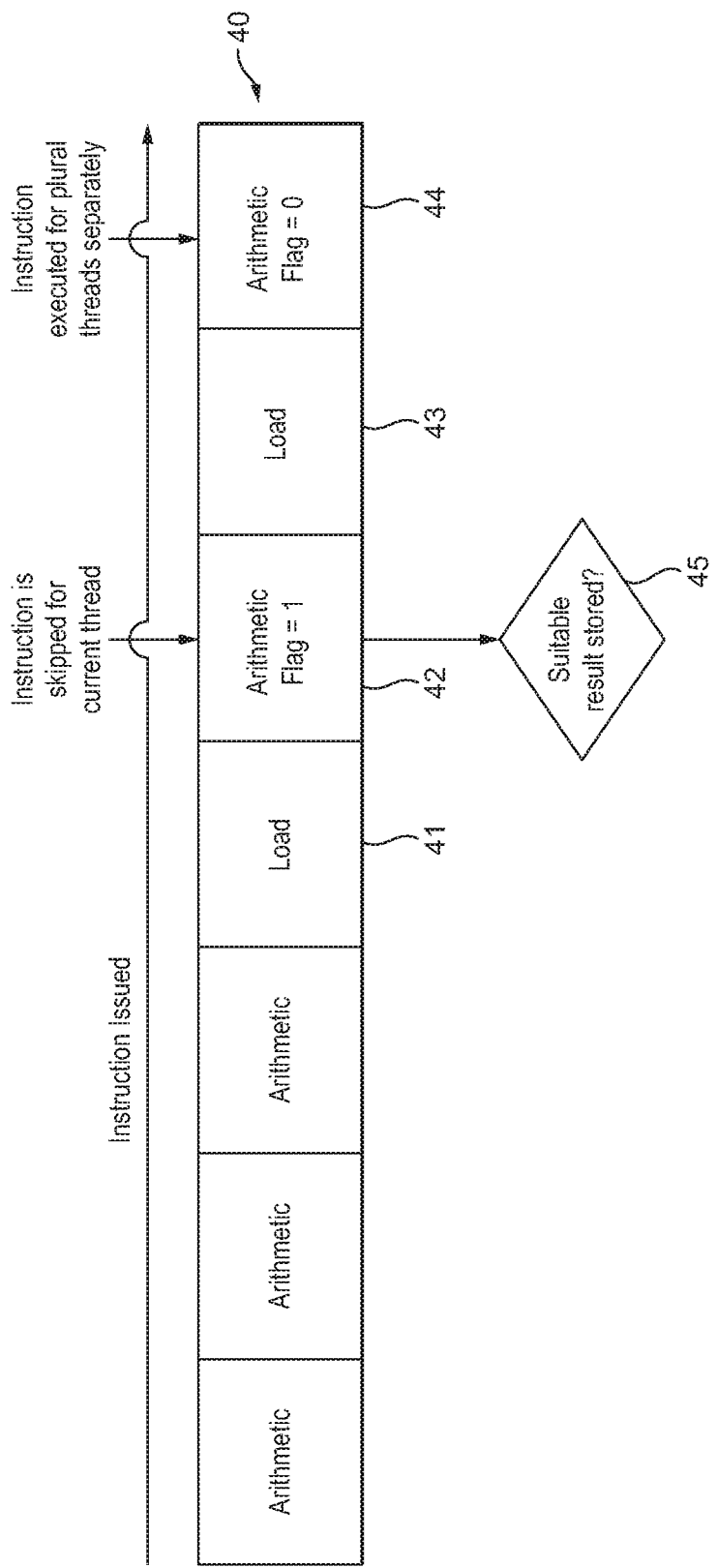
FIG. 4 shows schematically a set of instructions in an embodiment of the technology described herein.

FIG. 4 shows an example of a set of instructions 40 to be executed, in which it is assumed that the fourth instruction 41 is an external load instruction that is followed by an arithmetic instruction 42 that will use the data loaded by the load instruction as input data and will produce the same result for plural threads if the load instruction 41 loads the same data for each thread of the plural threads. It is also assumed that the next instruction 43 is another external load instruction, but in this case is followed by an instruction 44 that will produce a different result for each thread, even if the data loaded by the load instruction 43 is the same for each thread.

As shown in FIG. 4, when instruction 42 falls to be executed for the current thread, because that instruction is flagged as being an instruction that will produce the same result for plural threads (e.g. at least one thread of a first warp and at least one thread of a second warp) if the data loaded by the instruction 41 is the same for the plural threads, it is then determined 45 whether a suitable result of an earlier execution of the instruction 42 (and so a section of the sequence of instructions 40) is stored in memory. This will comprise determining whether the result of an earlier execution of instruction 42 that used the same input data as that which is intended to be used to execute instruction 42 for the current thread is stored in memory. This will be described in detail with respect to FIGS. 6 and 7.

Then, if it is determined that the result of an earlier execution of instruction 42, and that used the same input data as that which is intended to be used to execute instruction 42 for the current thread, is stored in memory, instruction 42 is skipped in the instruction sequence and the result that is stored in memory is fetched instead.

The result of executing instruction 42 may then be used when executing load instruction 43.

However, when the next instruction 44 is executed, because that instruction is not flagged as being an instruction that will produce the same result even if the data value loaded by instruction 43 is the same for different threads, arithmetic instruction 44 is then executed for the current thread.

An exemplary program for execution by a programmable processing stage that operation in the manner of the present embodiment can be applied to is set out below:

A=load (address_x)
B region start=A+1
C=B*2
D=C/3
E=D*C
F region_end=E/4
G=F*lane_id
H=func (G)

For this sequence of instructions, it can be seen that the result of the sixth instruction F will always be the same if the result of the previous load instruction A is the same for each thread of plural threads that are executing the program.

Accordingly, as shown in the example instruction sequence shown above, the second and sixth instructions (namely the instructions B and F) have associated flags set to indicate that they are the start and end, respectively, of a sequence of one or more instructions that if the external input data is the same for each thread, will produce the same result for each thread.

On the other hand, the next instruction G in the above example set of instructions is dependent upon the execution lane ID, such that even if the external input data loaded by the instruction A is the same for each thread, the result of instruction G using that external data will still differ for each thread of a thread group.

Figure 5:
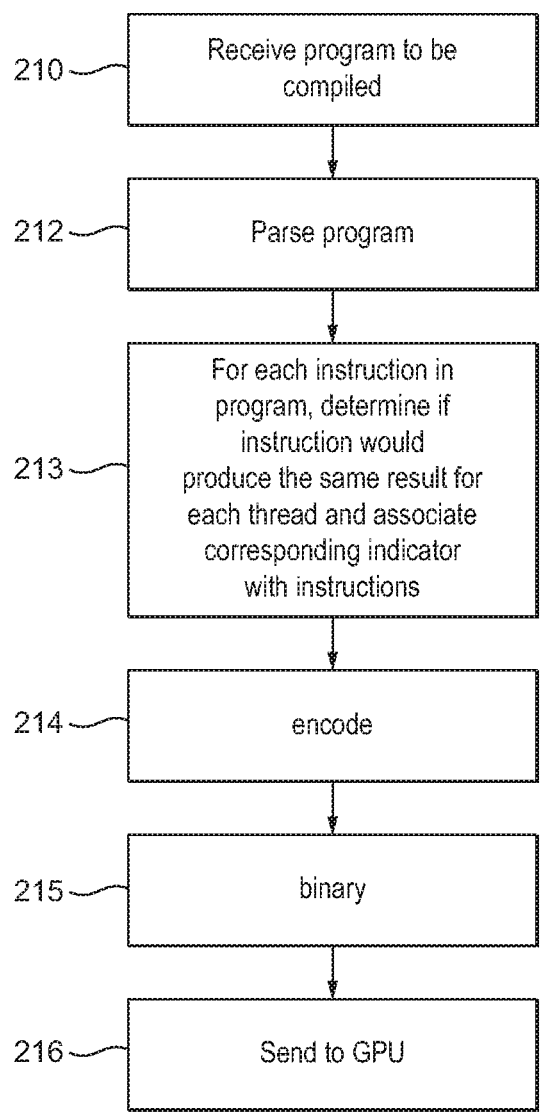
FIG. 5 shows schematically the compiler operation in an embodiment of the technology described herein.

FIG. 5 shows schematically the compiler operation for flagging a sequence of one or more instructions in a shader program to be executed that, if the input data is the same for each thread, will then produce the same result for each thread.

As shown in FIG. 5, the compiler receives the fragment shader program in the high level source language 210, and parses 212 that program.

As part of this operation, it identifies any program instructions that will use input data, and when such an instruction is identified, analyses the instruction to determine whether it is an instruction that would produce the same result for plural threads (e.g. a given group of plural threads, in an embodiment belonging to different thread groups) if the input data is the same for all the threads or not. The compiler then flags the instruction accordingly. (Step 213.)

This is done for each instruction in the program to be executed (that is being compiled).

The so-processed program is then encoded 214 into the appropriate binary code 215 for the graphics processing pipeline and sent 216 to the graphics processing pipeline (graphics processing unit (GPU)) for execution.

It will be appreciated here that any suitable and desired method could be used by the compiler to determine whether an instruction would produce the same result for plural threads. For example, the compiler could identify any program instructions that will load external data, and when such an instruction is identified, analyse the subsequent instructions to determine whether they are instructions that would produce the same result for plural threads if the externally loaded data is the same for all the threads or not (and the compiler will then flag the subsequent instruction(s) accordingly).

Figure 6:
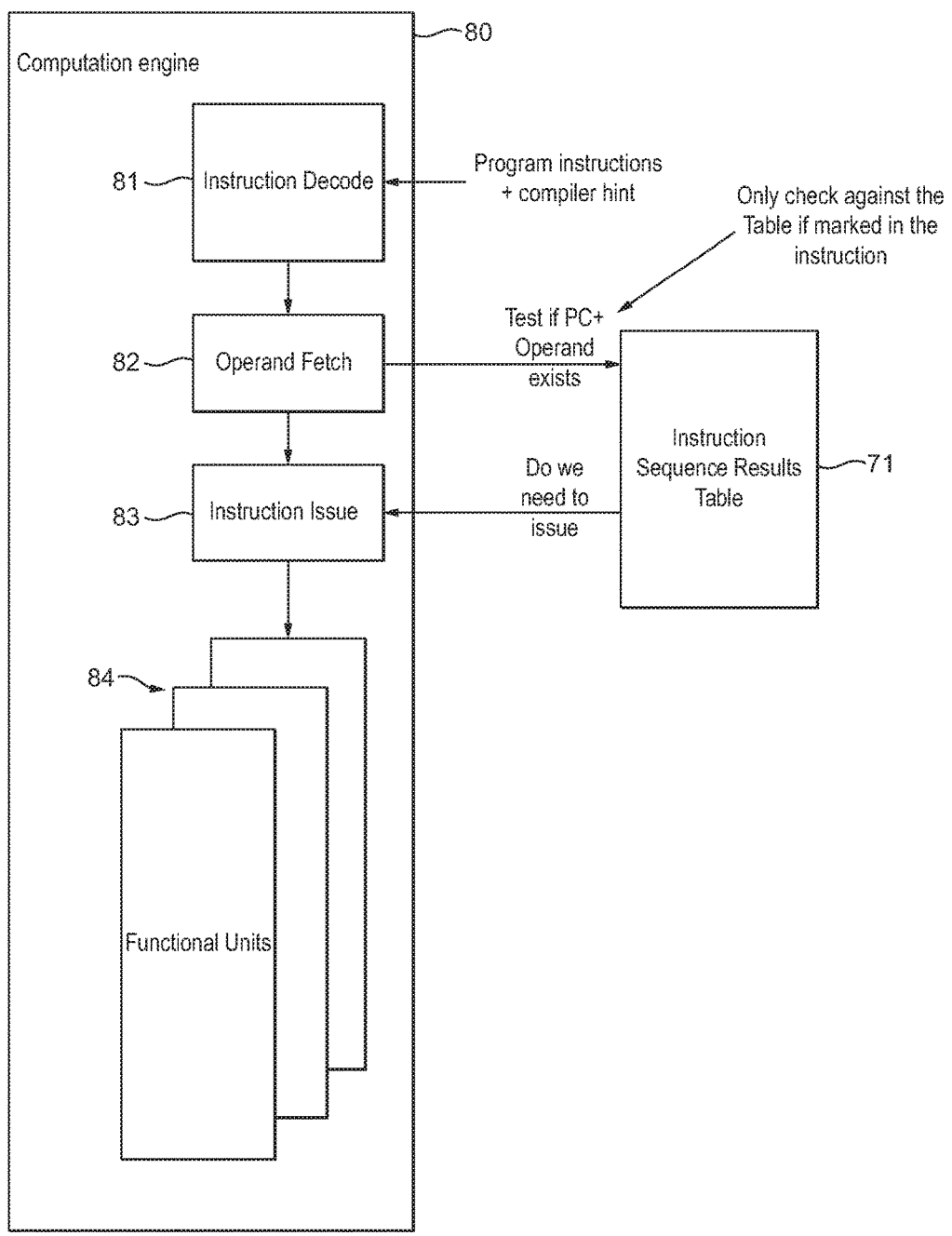
FIG. 6 shows schematically the operation of the programmable processing stage in an embodiment of the technology described herein.

FIG. 6 shows schematically the process and exchange of messages in an embodiment of the technology described herein when executing a set of instructions for a thread group.

As shown in FIG. 6, a computation engine 80 of a programmable processing stage of a data processor (such as a shader of a graphics processing pipeline) includes instruction decode circuitry 81 that decodes instructions for execution by execution threads, operand fetch circuitry 82 that is operable to fetch data in response to load instructions, instruction issue circuitry 83 that is operable to issue instructions to functional units 84, and a plurality of functional units 84.

The functional units 84 include, for example, appropriate execution (e.g. arithmetic) circuitry for performing processing operations for execution threads.

The operand fetch circuitry 82 is operable to, for example, when the instruction decode circuitry 81 issues a load instruction, correspondingly send a message to an external load unit (not shown), and write the data that is returned from the external source to appropriate registers for each execution thread (execution lane).

The computation engine 80 will also include write-back circuitry (not shown) that is operable to write data back to registers for respective functional units 84, and thread retire circuitry (not shown) that is operable to retire a thread once its processing has been completed, and to indicate such retirement to a thread scheduler (not shown) that is operable to issue threads to the computation engine 80 for execution.

As shown in FIG. 6, in normal operation of the computation engine 80, the instruction decode circuitry will decode instructions for execution by execution threads and pass those instructions to the operand fetch circuitry 82 that will then fetch any required data in response to load instructions. The instruction issue circuitry 83 will then issue the instructions to the functional units 84 for execution for execution threads.

However, as shown in FIG. 6, in the present embodiments this operation is modified in accordance with the technology described herein. In particular, as shown in FIG. 6, the operand fetch circuitry 82 is operable to interact with an instruction sequence result table 71 to, as discussed above, determine whether the result of executing at least a section of a sequence of instructions and using the same input data, has been stored in the instruction sequence result table 71. Correspondingly, the issue of instructions to the functional units 84 by the instruction issue circuitry 83 is controlled based on whether the result of executing a section of a sequence of instructions using the same input data is already stored in the instruction sequence result table 71 or not.

To facilitate this operation, as discussed above, and as shown in FIG. 6, the compiler 31 will provide 87 the computation engine 80 with the set of instructions (program) to be executed together with hints (identifiers) indicating which instructions belong to one or more sequences of instructions that will produce the same result if the same input data is used for each thread of plural threads.

Accordingly, as shown in FIG. 6, if the instruction decode circuitry 81 receives an instruction with an associated indication that it belongs to a sequence of instructions that will produce the same result if the same input data value(s) (operands) is used for each thread, then when the operands for that instruction are fetched by the operand fetch circuitry 82, the instruction sequence result table 71 is checked for the current thread to determine if a result of an earlier execution of the sequence of instructions (for the same operands) is stored in the instruction sequence result table 71.

The result of this determination is then be used to decide whether or not (and how) to issue the sequence of instructions to the functional units 84 for the current thread. (This will be discussed in more detail below.)

If the instruction received by the instruction decode circuitry 81 is not associated with an indication that it belongs to an identified sequence of instructions, then the instruction sequence result table 71 will not be checked at the operand fetch stage 82, and the instruction will be issued by the instruction issue circuitry 83 for execution by the functional units 84. This is then repeated for each subsequent instruction until an identified sequence of instructions is encountered, in which case the process of checking the instruction sequence result table 71 is performed.

Figure 7:
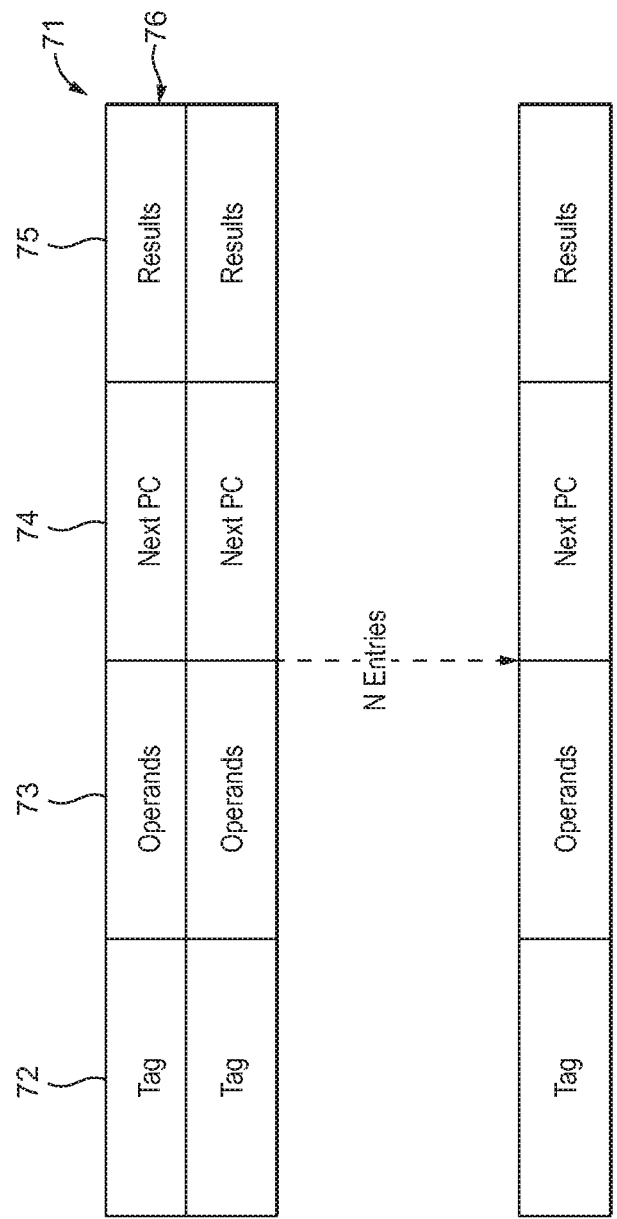
FIG. 7 shows schematically the instruction sequence table in an embodiment of the technology described herein.

The format of the instruction sequence result table 71 used in the present embodiments is shown in FIG. 7. Other arrangements for the instruction sequence result table 71 would, of course, be possible.

In the present embodiments, the instruction sequence result table 71 is stored in a cache memory accessible to the computation engine 80, with each line in the cache storing a given instruction sequence result entry for a particular execution (using a particular set of input data (operands)) of a particular sequence of instructions. The cache stores plural sets of instruction sequence results, and thus will include a number (N) of dedicated entries (cache lines) allocated for storing the results produced by an execution of a sequence of instructions, where each entry corresponds to an identified sequence of instructions executed using a given set of input data.

As can be seen from FIG. 7, the results 75 produced by executing a sequence of instructions in a set of instructions for a given set of input data are stored in an entry 76 in the instruction sequence table 71 in association with a tag 72 (an identifier) for the sequence of instructions that the entry 76 relates to. In the present embodiment, the tag (identifier) 72 for a stored instruction sequence result corresponds to the program count (PC) of the first instruction in the sequence of instructions that the stored results relate to in the set of instructions (program) in question.

As shown in FIG. 7, each instruction sequence result entry 76 in the instruction sequence result table 71 also stores an indication of the input data (operands) 73 that was used when executing the sequence of instructions that the entry 76 relates to, to produce the results 75 stored for the entry 76. In the present embodiment, the actual operands 73 used to execute the first instruction in the sequence of instructions to which the entry 76 relates to, is stored in the entry 76 in the instruction sequence result table 71.

As shown in FIG. 7, the instruction sequence result table 71 also stores in each entry 76, an identifier 74 for the next instruction in the set of instructions that will need to be executed by a thread that is able to use the results 75 stored for the sequence of instructions. In the present embodiment, this identifier 74 is the program count (PC) for the next instruction to be executed (i.e. the next instruction after the section of the sequence of instructions for which the results 75 are stored in the instruction sequence result table entry 76).

Other arrangements for the instruction sequence result tale 71, and/or for the entries 76 in that table, would, of course, be possible.

It can be seen from FIG. 7 that the instruction sequence result table 71 will provide the computation engine 80 (the programmable processing stage, e.g. shader) with all the information which is necessary in order for it to skip (in certain circumstances) the execution of a section of a sequence of one or more instructions while still being able to continue to process the remaining instructions in the program being executed.

FIGS. 8, 9, 10, 11, 12 and 13 show two embodiments for the operation of the computation engine 80 when using the instruction sequence result table 71 in the manner of the technology described herein.

Figure 8:
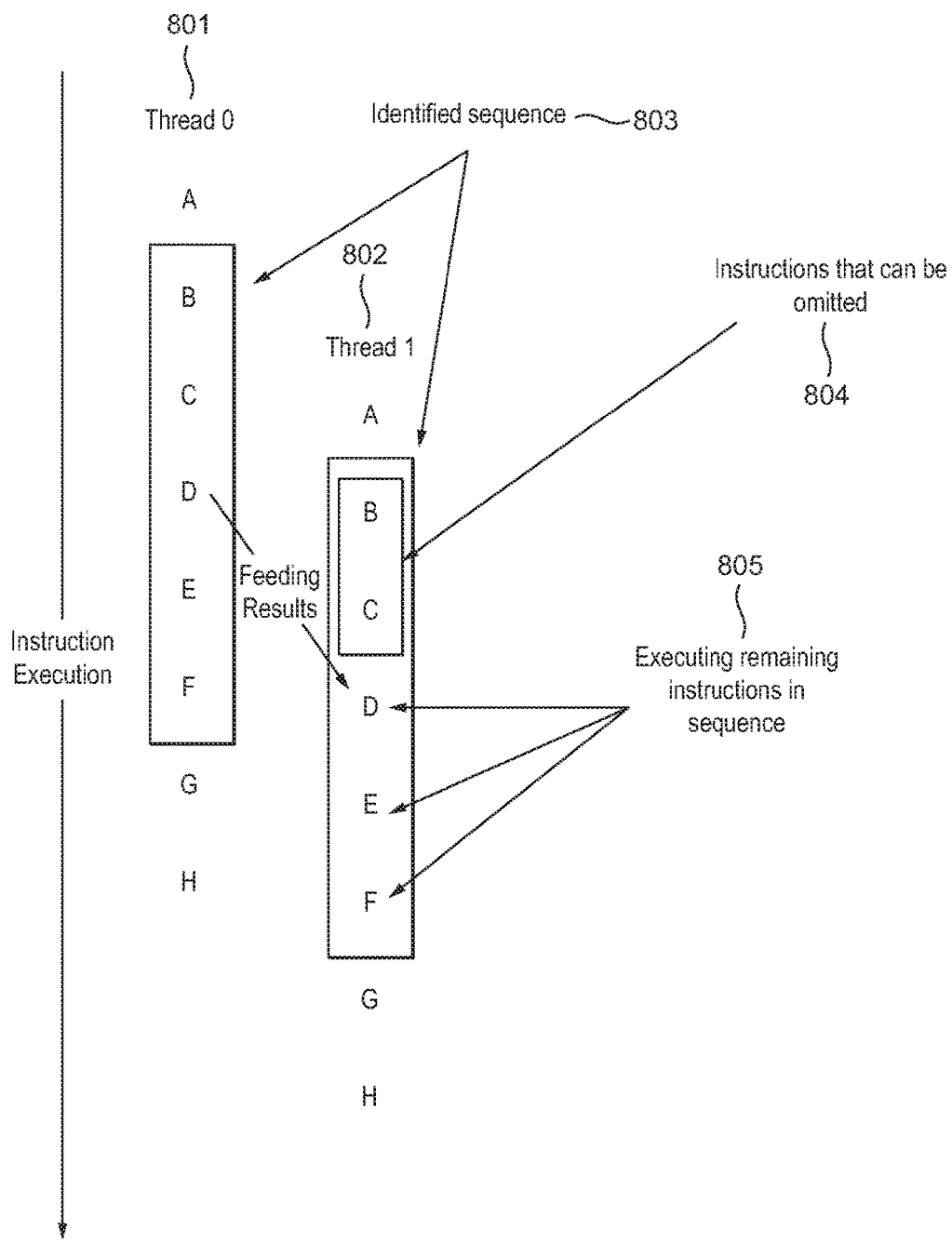
FIG. 8 shows schematically the operation of the programmable processing stage in an embodiment of the technology described herein.
Figure 9:
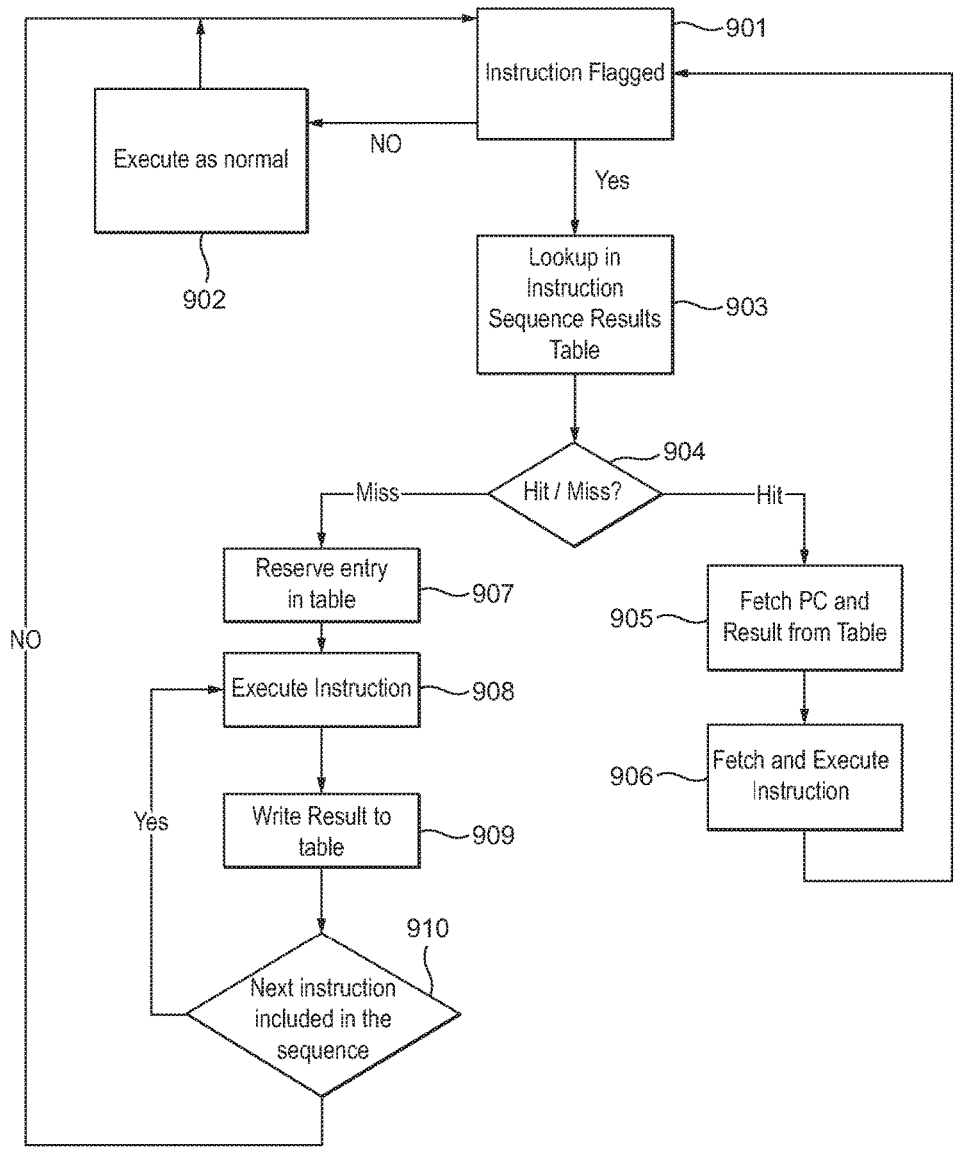
FIG. 9 is a flow chart illustrating the operation shown in FIG. 8.

FIGS. 8 and 9 show an embodiment in which a later execution thread can use the results produced by execution of a sequence of instructions by an earlier thread even where the earlier execution thread has not yet completed execution of the sequence of instructions in its entirety.

FIGS. 10, 11, 12 and 13 show another embodiment, in which a later execution thread that can use the results of executing a sequence of instructions by an earlier execution thread waits until the earlier execution thread has completed the entire sequence of instructions before using the result of the execution of the sequence of instructions by the earlier execution thread.

FIG. 9 is a flow chart illustrating the operation of the computation engine 80 (and programmable processing stage) in one embodiment of the technology described herein.

As shown in FIG. 9, when a new instruction to be executed by a thread is decoded, it is first checked whether the instruction is flagged as belonging to an identified sequence of instructions that will produce the same result if plural threads were to execute the sequence of instructions using the same input data (step 901).

If the instruction does not belong to such a flagged sequence of instructions, then the instruction will be executed for the thread in the normal manner (step 902), and the process will then continue with the next instruction in the set of instructions being executed by the thread (step 901).

If, however, the instruction is flagged as belonging to an identified sequence of instructions that will produce the same result if plural threads were to execute the sequence of instructions using the same input data, it is then checked whether a previously generated result for the sequence of instructions and that used the same input data as that which is to be used for the current thread is stored in the instruction sequence results table 71 (step 903). As discussed above, this check will comprise determining whether there is an entry in the instruction sequence results table 71 for the sequence of instructions in question, and, furthermore, whether the stored operands 73 for the instruction sequence result in the instruction sequence results table 71 match the operands fetched (by the operand fetch stage 82) for the current thread.

When it is determined that a result produced by an earlier execution of a section of the identified sequence of instructions, and for the same input data, is stored in the instruction sequence results table 71 (there is a cache "hit") (step 904), then, as shown in FIG. 9, the programmable processing stage (the computation engine 80) fetches the stored results produced by the earlier execution of the sequence of instructions, and the indicator (the program count (PC)) of the next instruction in the set of instructions to be executed, from the instruction sequence results table 71 (step 905).

The programmable processing stage (the computation engine 80) will then fetch the instruction in the set of instructions indicated by the next instruction indicator (PC) 74 fetched from the instruction sequence results table entry, and execute that instruction using the stored result fetched from the instruction sequence results table entry (step 906).

Thus the programmable processing stage will return to step 901 for that next instruction and process that instruction accordingly.

In this embodiment, the next instruction may be a remaining instruction in the identified sequence of instructions, or an instruction that is subsequent to the identified sequence of instructions.

If, however, it is determined at step 904 that a result produced by an earlier execution of a section of the identified sequence of instructions, and for the same input data, is not stored in the instruction sequence results table 71 in memory (there is a cache "miss"), then, as shown in FIG. 9, the programmable processing stage (the computation engine 80) will execute the sequence of instructions for its set of input data.

In this case, the programmable processing stage first (attempts to) reserves an entry (a cache line) in the instruction sequence results table (step 907). An entry in the instruction sequence results table to be allocated to a thread could be determined, for example, using any appropriate cache line allocation process, such as a least recently used (LRU) process.

When an entry in the instruction sequence results table 71 is allocated to a thread for storing its results when executing a sequence of instructions, the allocated entry (cache line) in the instruction sequence results table 71 will, as discussed above, be tagged with an identifier for the sequence of instructions in question (in the present embodiment in the form of the program count (PC) for the first instruction in the sequence of instructions). The operands (input data) fetched for executing the sequence of instructions will also be stored in the allocated instruction sequence results table entry (cache line).

The programmable processing stage (the computation engine 80) will then execute the instructions in the sequence of instructions in turn, and each time it executes an instruction in the sequence of instructions, write the result of executing that instruction of the sequence of instructions to the allocated entry in the instruction sequence result table (steps 908, 909 and 910).

The programmable processing stage (computation engine 80) will also store and update the next instruction program count (PC) in the allocated instruction sequence results table entry each time it executes an instruction in the sequence of instructions (at step 909).

Thus, the programmable processing stage will execute the instructions in the sequence of instructions in turn, and each time it executes an instruction in the sequence of instructions, both write the result of executing that instruction of the sequence of instructions to the allocated entry in the instruction sequence results table, and update the next instruction program count (PC) in the instruction sequence results table entry accordingly.

Once the sequence of instructions has been executed, then the process will return to consider the next instruction in the set of instructions (program) being executed (step 901). (The completion of the sequence of instructions may be identified at step 910 by, for example, determining that the next instruction in the set of instructions is flagged as being the end of the identified sequence of instructions.)

(In the event that there is not an available entry in the instruction sequence results table (e.g. cache) for the results of executing the sequence of instructions at step 907, then the sequence of instructions could, e.g., still be executed for the thread, but without storing the results in the instruction sequence results table, or, alternatively, the execution of the sequence of instructions by the thread could be stalled until there is an available entry for the results in the instruction sequence results table.)

FIG. 8 schematically illustrates the above operation shown in FIG. 9 for a pair of threads (Thread 0 801 and Thread 1 802) that are each to execute the set of instructions A to H discussed above.

As discussed above, it is assumed that the sequence 803 of instructions B to F of the set of instructions A to H is a sequence of instructions that will produce the same result for plural threads (i.e. for both Thread 0 and Thread 1) if it is executed by those plural threads using the same input data. Thus, the compiler of the data processing system will have flagged instructions B and F in the set of instructions A to H to be executed as being the start and end, respectively, of a sequence of instructions that will produce the same result for different threads when executed using the same input data.

In the example operation shown in FIG. 8, it is assumed that Thread 0 starts executing the set of instructions A to H first, with Thread 1 executing the set of instructions A to H sometime later, using the same input data as Thread 0.

Thus, as shown in FIG. 8, Thread 0 will begin executing the sequence of instructions A to H, and when it reaches the identified sequence 803 of instructions B to F will execute those instructions and store the results of its execution of those instructions in the instruction sequence results table 71 in the manner discussed above in relation to FIG. 9.

Then, and as can be seen in FIG. 8, by the time that the set of instructions A to H falls to be executed for the later Thread 1, a section of the identified sequence of instructions 803 (in particular instructions B and C) will have already been executed by the earlier Thread 0, and so the results produced by executing instructions B and C for Thread 0 will have been stored in the instruction sequence results table 71.

The programmable processing stage executing the set of instructions for Thread 1 will accordingly, when it reads instruction B, determine whether an entry in the instructions sequence table has associated with it an identifier corresponding to the identified sequence 803 of instructions B to F and the same operands that are intended to be used to execute instruction B for Thread 1.

In this case, it will be determined for Thread 1 that a result produced by an earlier execution of (at least a section of) the identified sequence 803 of instructions B to F and that used the same operands as that which is intended to be used to execute the identified sequence 803 of instructions for Thread 1 is stored in the instruction sequence result table (as Thread 0 has already executed instructions B and C using the same input data and stored its result). Thus, the programmable processing stage will read from the entry in the instruction sequence results table 71 for the sequence 803 of instructions B to F stored by Thread 0, the result currently stored in the instruction sequence results table for the sequence of instructions B to F, and the indication of the next instruction to be executed if using the stored result.

In the present example, as shown in FIG. 8, it is assumed that when Thread 1 reaches instruction B, Thread 0 has executed instructions B and C but not instructions D to F of the identified sequence 803 of instructions B to F. Accordingly, Thread 1 will be able to retrieve from the instruction sequence results table the results of executing instructions B and C (which has already been done by Thread 0), and will also retrieve from the instruction sequence results table an indication that instruction D is the next instruction to be executed when using the stored result.

Accordingly, the programmable processing stage will skip 804 the execution of instructions B and C for Thread 1 and instead retrieve the result produced by executing instructions B and C for the earlier Thread 0 from the instruction sequence results table, thereby reducing the processing burden on the system.

Thread 1 will then proceed to execute the remaining instructions in the set of instructions A to H, starting with instruction D (and so including the other instructions D to F 805 in the identified sequence 803 of instructions), independently of Thread 0.

When considering the method illustrated in FIG. 9 with regard to the example shown in FIG. 8, the programmable processing stage will perform steps 907 to 910 for Thread 0 of FIG. 8, and steps 905 and 906 of FIG. 9 for Thread 1 of FIG. 8.

It can be seen from FIGS. 8 and 9 that in this embodiment the data processing system will be able to skip executing some or all of an identified sequence of instructions, with the number of instructions that can be skipped being dependent on the timing of when the sequence of instructions falls to be executed by a later thread (Thread 1 in FIG. 8) compared to the first thread (Thread 0). For example, in the example of FIG. 8 the system will avoid executing two instructions (instructions B and C) of the sequence of instructions 803, for the later Thread 1.

FIGS. 10, 11, 12 and 13 show another embodiment in which a later thread only retrieves the results produced by the earlier execution of an identified sequence of instructions once the execution of the sequence of instructions by the earlier thread has completely finished (such that the earlier thread will have stored its results produced for the entire sequence of instructions in the instruction sequence results table).

This will then allow the later thread to skip (omit) the execution of the entire sequence of instructions in question.

This is achieved by the first thread that is to execute a sequence of instructions locking the corresponding instruction sequence results table entry for that sequence of instructions once it starts executing the sequence of instructions, and then unlocking the entry once it has completed execution of the sequence of instructions. Later threads correspondingly determine whether there is a locked instruction sequence results table entry for a sequence of instructions that they are to execute, and if so, stall their execution of the set of instructions that the sequence of instructions belongs to until the instruction sequence result entry is unlocked (at which point the later thread will retrieve the stored instruction sequence results from the now unlocked instruction sequence results table entry and continue execution of the set of instructions after the sequence of instructions in question).

Figure 11:
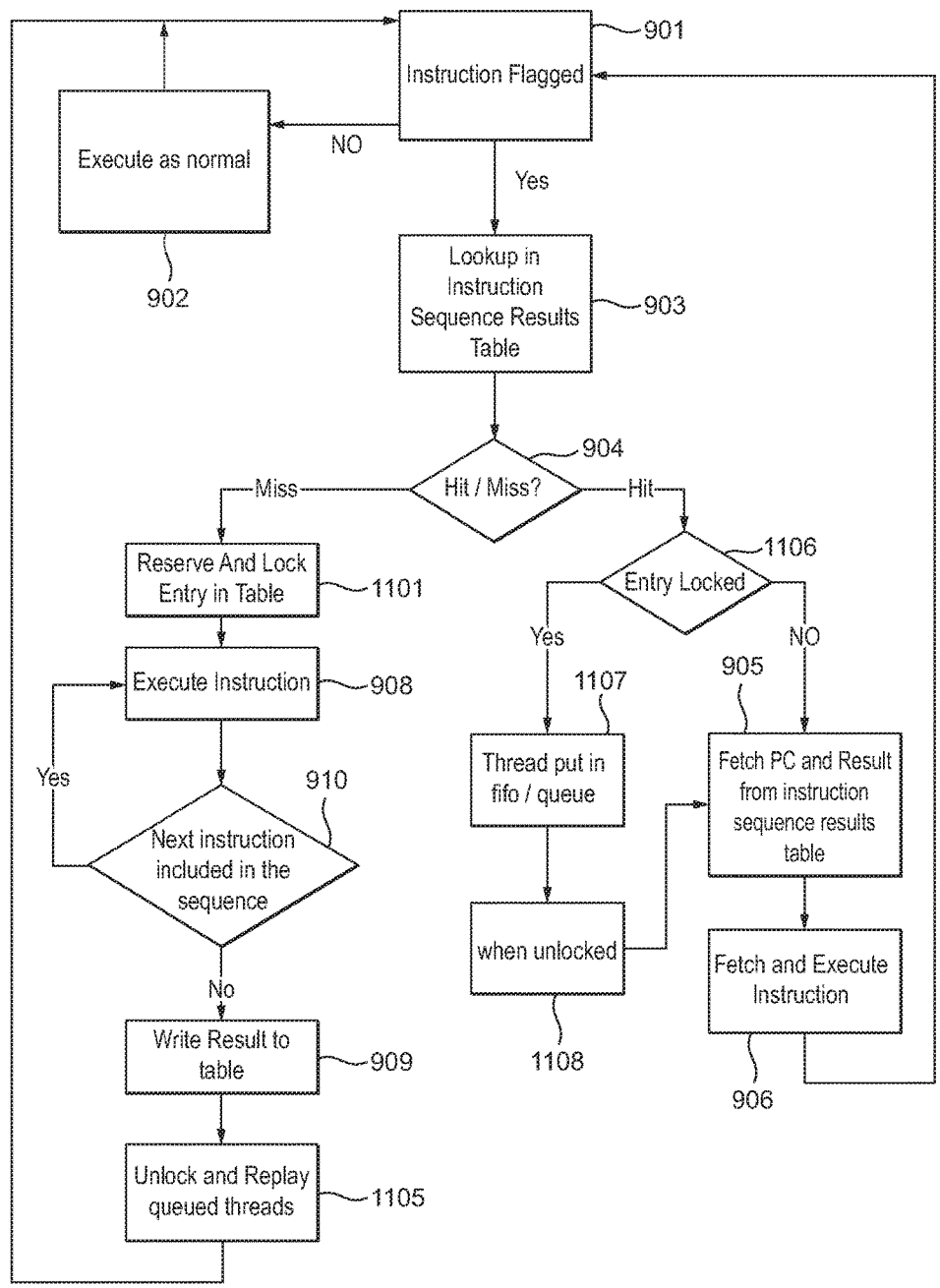
FIG. 11 is a flow chart illustrating the operation shown in FIG. 10.

FIG. 11 is a flow chart illustrating the operation of the computation engine 80 (and programmable processing stage) in this embodiment of the technology described herein.

The operation illustrated in FIG. 11 is similar to that of FIG. 9, except in relation to the accessing of entries in the instruction sequence table 71 by later threads.

Thus, as shown in FIG. 9, when a new instruction to be executed by a thread is decoded, it is again first checked whether the instruction is flagged as belonging to an identified sequence of instructions that will produce the same result if plural threads were to execute the sequence of instructions using the same input data (step 901).

Again, if the instruction does not belong to such a flagged sequence of instructions, then the instruction will be executed for the thread in the normal manner (step 902), and the process will then continue with the next instruction in the set of instructions being executed by the thread (step 901).

If, however, the instruction is flagged as belonging to an identified sequence of instructions that will produce the same result if plural threads were to execute the sequence of instructions using the same input data, it is then checked whether a previously generated result for the sequence of instructions and that used the same input data as that which is to be used for the current thread is stored in the instruction sequence results table 71 (step 903). As discussed above, this check will again comprise determining whether there is an entry in the instruction sequence results table 71 for the sequence of instructions in question, and, furthermore, whether the stored operands 73 for the instruction sequence result in the instruction sequence results table 71 match the operands fetched (by the operand fetch stage 82) for the current thread.

When it is determined that a result produced by an earlier execution of a section of the identified sequence of instructions, and for the same input data, is stored in the instruction sequence results table 71 (there is a cache "hit") (step 904), then, as shown in FIG. 9, the programmable processing stage (the computation engine 80) will operate to fetch the stored results produced by the earlier execution of the sequence of instructions, and the indicator (the program count (PC)) of the next instruction in the set of instructions to be executed, from the instruction sequence results table 71.

However, in this embodiment, and as shown in FIG. 11, the programmable processing stage (the computation engine 80) will, when it is determined that a result produced by an earlier execution of a section of the identified sequence of instructions, and for the same input data, is stored in the instruction sequence result table 71, first determine whether the entry (cache line) in question in the instruction sequence results table 71 is currently locked or not (step 1106). This can be done in any suitable and desired manner, such as, and in an embodiment, in the normal manner for determining whether a cache line is locked in the data processing system in question. Thus this could be done, for example, by determining if a flag stored in association with the entry (cache line) is set to indicate that the entry is locked or not.

As will be discussed further below, in this embodiment, an entry (a cache line) for an instruction sequence result in the stored instruction sequence results table 71 is locked whilst the sequence of instructions is being executed by the thread that is storing the results for the sequence of instructions in the instruction sequence results table 71, and only unlocked once the thread that is executing the sequence of instructions to store the results for the sequence of instructions in the instruction sequence results table has completed its execution of the entire sequence of instructions.

As shown in FIG. 11, if it is determined that the relevant entry (cache line) in the instruction sequence result table 71 is not locked, then the programmable processing stage (computation engine 80) will fetch the stored results (in this case for the entire sequence of instructions) produced by the earlier execution of the sequence of instructions, and the indicator (the program count (PC)) of the next instruction in the set of instructions to be executed, from the instruction sequence results table 71 (step 905).

The programmable processing stage (the computation engine 80) will then fetch the instruction in the set of instructions indicated by the next instruction indicator (PC) 74 fetched from the instruction sequence results table entry, and execute that instruction using the stored result fetched from the instruction sequence results table entry (step 906).

Thus the programmable processing stage will return to step 901 for that next instruction and process that instruction accordingly.

In this embodiment, the next instruction will be an instruction that is subsequent to the identified sequence of instructions (namely the instruction that (immediately) follows the sequence of instructions in question).

On the other hand, if it is determined that the entry (cache line) in the instruction sequence result table 71 for the instruction sequence is locked, then as shown in FIG. 11, the current thread is added to a queue to await the completion of the execution of the entire sequence of instructions by the earlier thread (step 1107). In the present embodiment, this queue of waiting threads is in the form of a FIFO, but other arrangements would, of course, be possible.

The thread is then held in the queue (stalled) until the instruction sequence results table entry (cache line) is unlocked, at which point the programmable processing stage (the computation engine) will then operate to fetch the stored results produced by the earlier execution of the sequence of instructions, and the indicator (the program count (PC)) of the next instruction in the set of instructions to be executed from the (now unlocked) entry in the instruction sequence results table 71 (steps 1108 and 905) and will then proceed to fetch and execute the next indicated instruction in the set of instructions, and so on (as discussed above).

As shown in FIG. 11, if, on the other hand, it is determined at step 904 that a result produced by an earlier execution of a section of the identified sequence of instructions, and for the same input data, is not stored in the instruction sequence results table 71 in memory (there is a cache "miss"), then, as shown in FIG. 11, the programmable processing stage (the computation engine 80) will execute the sequence of instructions for its set of input data.

In this embodiment, the programmable processing stage will again first (attempt to) reserve an entry (a cache line) in the instruction sequence results table (step 1101). An entry in the instruction sequence results table to be allocated to a thread could be determined, for example, using any appropriate cache line allocation process, such as a least recently used (LRU) process.

When an entry in the instruction sequence results table 71 is allocated to a thread for storing its results when executing a sequence of instructions, the allocated entry (cache line) in the instruction sequence results table 71 will, as discussed above, be tagged with an identifier for the sequence of instructions in question (in the present embodiment in the form of the program count (PC) for the first instruction in the sequence of instructions). The operands (input data) fetched for executing the sequence of instructions will also be stored in the allocated instruction sequence results table entry (cache line).

However, as shown in FIG. 11, in this embodiment, as well as reserving an entry (cache line) in the instruction sequence results table 71, the reserved entry (cache line) is also locked for the exclusive use of the thread that is executing the sequence of instructions and storing its results in the allocated entry (cache line) in the instruction sequence results table 71.

The programmable processing stage (the computation engine 80) will then execute the instructions in the sequence of instructions in turn (steps 908 and 910).

Once it is determined at step 910 that the thread has executed the sequence of instructions in its entirety (has executed the complete sequence of instructions in question), then, as shown in FIG. 11, the results of executing the sequence of instructions, and the next instruction program count (PC), are written to the allocated entry in the instruction sequence result table (step 909). (The completion of the sequence of instructions may again be identified at step 910 by, for example, determining that the next instruction in the set of instructions is flagged as being the end of the identified sequence of instructions.)

(The programmable processing stage could, alternatively, update the instructions sequence results table entry each time it executes an instruction in the sequence of instructions, if desired.)

Once it is determined at step 910 that the thread has executed the sequence of instructions in its entirety (has executed the complete sequence of instructions in question), then, as shown in FIG. 11, the instruction sequence results table entry (cache line) storing the results of the execution of the sequence of instructions is unlocked, and any queued threads awaiting the results of the execution of that sequence of instructions are released from the queue and their processing continued as described above (in relation to when the instruction sequence results table entry that they are awaiting is unlocked) (step 1105).

Correspondingly, the processing for the thread that has completed the execution of the sequence of instructions will return to consider the next instruction in the set of instructions (program) being executed (step 901).

(Again, in the event that there is not an available entry in the instruction sequence results table (e.g. cache) for the results of executing the sequence of instructions at step 907, then the sequence of instructions could, e.g., still be executed for the thread, but without storing the results in the instruction sequence results table, or, alternatively, the execution of the sequence of instructions by the thread could be stalled until there is an available entry for the results in the instruction sequence results table.)

Figure 10:
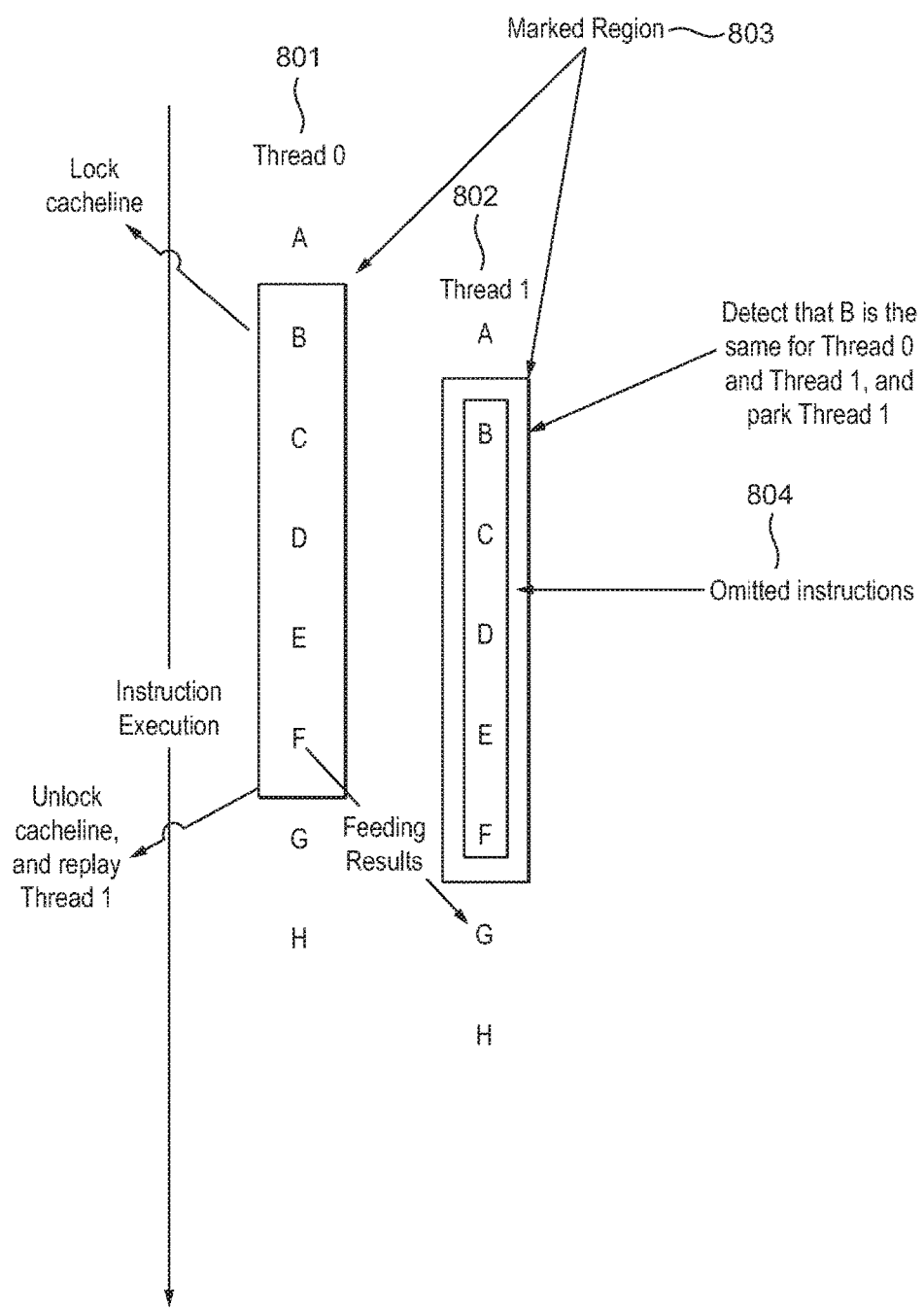
FIG. 10 shows schematically the operation of the programmable processing stage in an embodiment of the technology described herein.
Figure 12:
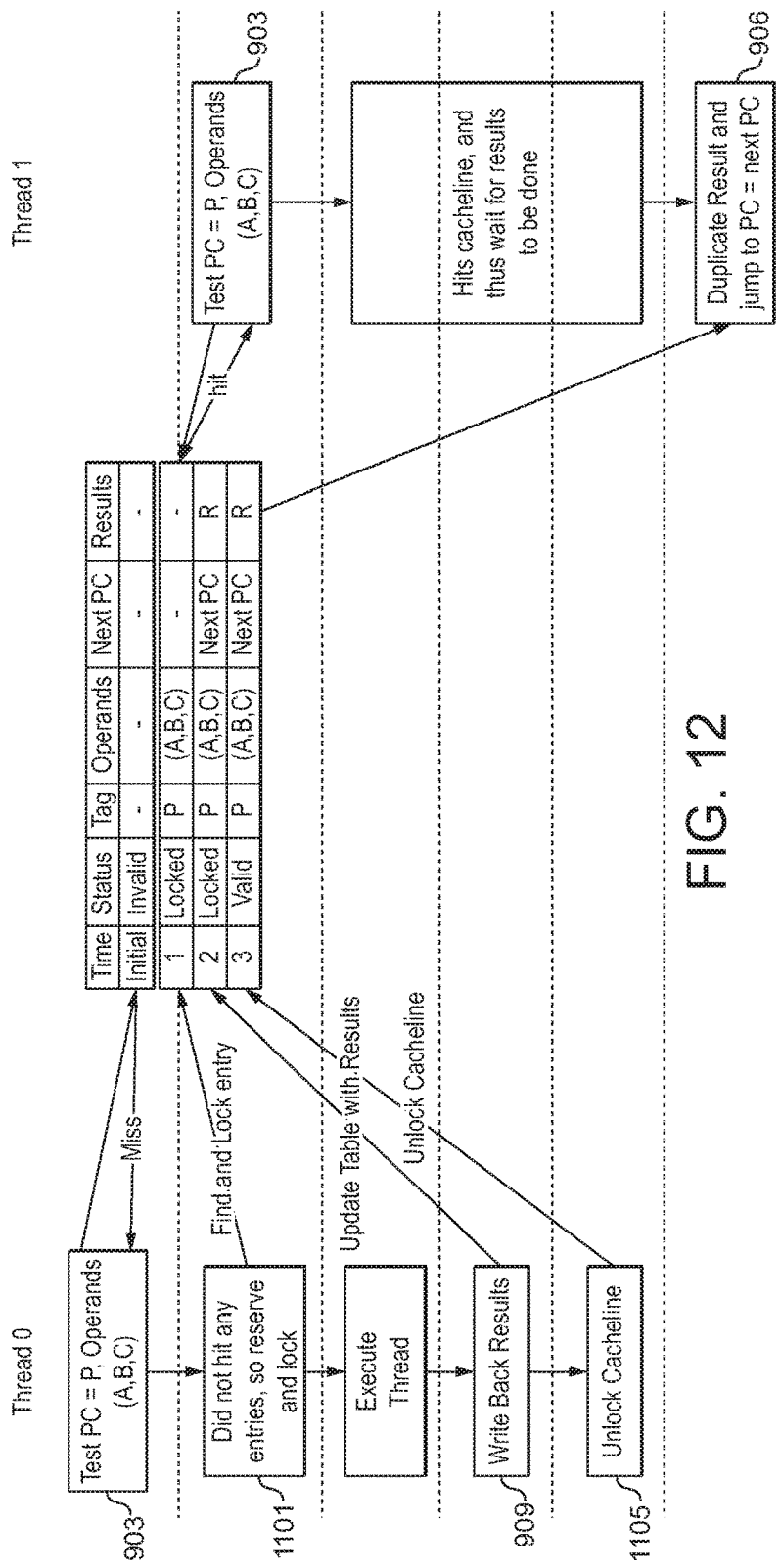
FIG. 12 shows schematically the operation shown in FIG. 10.

FIGS. 10 and 12 schematically illustrate the above operation shown in FIG. 11 for a pair of threads (Thread 0 801 and Thread 1 802) that are each to execute the same set of instructions A to H discussed above.

As discussed above, it is again assumed that the sequence 803 of instructions B to F of the set of instructions A to H is a sequence of instructions that will produce the same result for plural threads (i.e. for both Thread 0 and Thread 1) if it is executed by those plural threads using the same input data. Thus, the compiler of the data processing system will have flagged the sequence 803 of instructions B to F in the set of instructions A to H to be executed as being a sequence of instructions that will produce the same result for different threads when executed using the same input data.

In the example operation shown in FIG. 10, it is again assumed that Thread 0 starts executing the set of instructions A to H first, with Thread 1 executing the set of instructions A to H sometime later, using the same input data as Thread 0.

Thus, as shown in FIGS. 10 and 12, Thread 0 will begin executing the sequence of instructions A to H, and when it reaches the identified sequence 803 of instructions B to F will reserve and lock on entry (a cache line) in the instruction sequence results table and then execute instructions B to F and store the results of its execution of those instructions in the instruction sequence results table 71 in the manner discussed above in relation to FIG. 11, and once it has done so, unlock the entry (cache line) in the instruction sequence results table.

As can be seen in FIGS. 10 and 12, when the set of instructions A to H falls to be executed for the later Thread 1, the programmable processing stage executing the set of instructions for Thread 1 will accordingly, when it reads instruction B, determine whether an entry in the instruction sequence results table has associated with it an identifier corresponding to the identified sequence 803 of instructions B to F and the same operands that are intended to be used to execute instruction B for Thread 1.

In this case, it will be determined for Thread 1 that there is a "locked" instruction sequence results table entry for the identified sequence 803 of instructions B to F and that used the same operands as that which is intended to be used to execute the identified sequence 803 of instructions for Thread 1 (as Thread 0 is in the process of executing instructions B to F using the same input data). Thus, the programmable processing stage will stall the execution of the set of instructions A to H by the later thread, Thread 1, until the instruction sequence results table entry is unlocked by Thread 0, at which point the programmable processing stage will read from the (now unlocked) entry in the instruction sequence results table the results for the sequence of instructions B to F stored by Thread 0, and the indication of the next instruction to be executed when using the stored result (which will be instruction G in this example).

Accordingly, the programmable processing stage will skip 804 the execution of instructions B to F for Thread 1 and instead retrieve the result produced by executing instructions B to F for the earlier Thread 0 from the instruction sequence results table, thereby reducing the processing burden on the system.

Thread 1 will then proceed to execute the remaining instructions in the set of instructions A to H, starting with instruction G, independently of Thread 0.

When considering the method illustrated in FIG. 11 with regard to the example shown in FIG. 10, it will be appreciated that the programmable processing stage will perform steps 1101, 908-910 and 1105 of FIG. 11 for Thread 0 of FIG. 10, and steps 1106-1108, 905 and 906 of FIG. 11 for Thread 1 of FIG. 10.

It can be seen from FIGS. 10, 11 and 12 that in this embodiment the data processing system will be able to skip executing all of an identified sequence of instructions by a later thread (Thread 1 in FIG. 10) compared to the first thread (Thread 0).

Figure 13:
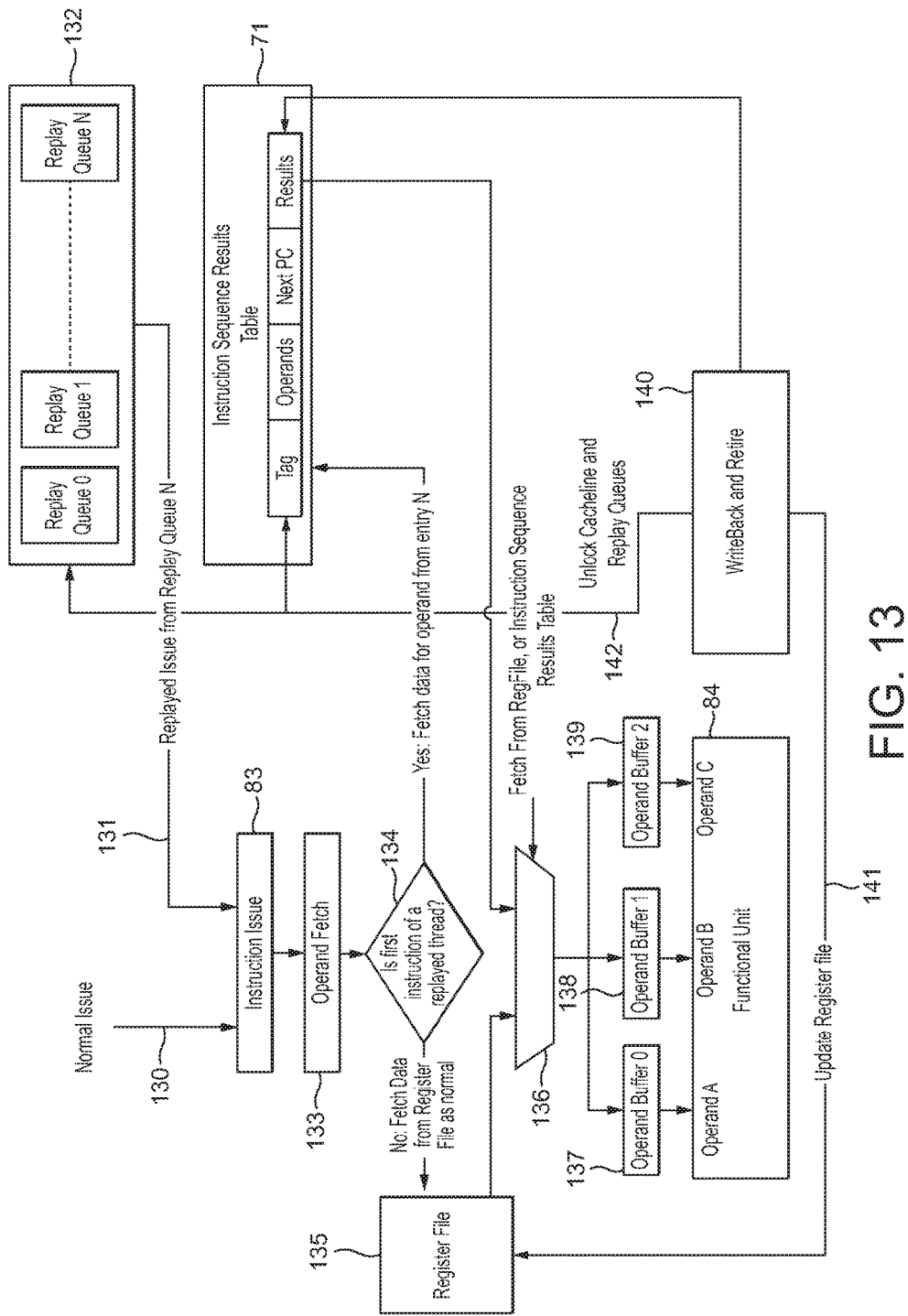
FIG. 13 further illustrates the operation of the embodiment shown in FIGS. 10 to 12.

FIG. 13 shows in more detail the operation of this embodiment when, inter alia, issuing instructions from a queue of waiting instructions once an earlier thread has completed its execution of the sequence of instructions that the queue in question relates to.

FIG. 13 starts at the point where it has been determined that an instruction should be issued to the functional units 84 for execution. Thus, as shown in FIG. 13, the instruction issue stage (unit) 83 will either receive a new instruction for execution in the normal manner 130 or receive an instruction that is to be "replayed" 131 from a given instruction queue of the set of instruction queues 132 that are awaiting completion of sequences of instructions by earlier threads.

Once the instruction is issued, the process then operates to fetch 133 the appropriate operands for that instruction. As part of this operation, as shown in FIG. 13, it is determined 134 whether the instruction that is being executed is the first instruction of a "replayed" thread (i.e. a previously queued execution thread) or not. If the instruction is the first instruction of a "replayed" thread, then as shown in FIG. 13, the operand data will be fetched from the corresponding entry in the instruction sequence results table 71. On the other hand, if the instruction being executed is not the first instruction of a previously queued thread, then the input data will be fetched from the register file 135 in the normal manner.

The appropriate input data, whether fetched from the register file or the instruction sequence results table, is then loaded 136 into the appropriate input data (operand) buffers 137, 138, 139 for use by the functional unit 84 when executing the instruction.

Once the instruction (or appropriate sequence of instructions) has been executed, write back and retire circuitry (unit) 140 will appropriately retire the execution thread in question, update the register file 141, update 143 the corresponding instruction sequence results table entry, and, if appropriate, unlock 142 the corresponding instruction sequence results table entry and the corresponding thread "replay" queue.

As shown in FIG. 13, the system maintains a set 132 of plural reply queues into which threads awaiting the completion of a sequence of instructions by an earlier thread can be placed, with each replay queue corresponding to a particular instruction sequence results table entry (and having an identifier that corresponds to that instruction sequence results table entry).

Although the technology described herein has been described above with particular reference to a graphics processor and graphics processing pipelines, as will be appreciated by those skilled in the art, the technology described herein can be used in any form of data processing system and data processing pipeline where plural execution threads may execute the same sequences of instructions, using (potentially) the same input data, such as, for example, in SIMD (Single Instruction Multiple Data) machines more generally.

As can be seen from the above, the technology described herein, in its embodiments at least, facilitates skipping execution of instructions to be executed by programmable processing stages of data processing systems when plural execution threads are each to execute the same set of instructions (potentially) using the same input data. This can accordingly reduce resource and power consumption, etc., when executing the instructions for the plural threads.

This is achieved, in the embodiments of the technology described herein at least, by identifying sequences of instructions that provide a potential opportunity for instruction execution skipping, and storing the results produced by execution of the sequences in memory for use by later threads.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system which includes a programmable processing stage that executes sets of instructions to perform processing operations, and in which plural execution threads may each execute a same set of instructions;
   the method comprising:
   for a program comprising a set of instructions for execution by the programmable processing stage of the data processing system:

identifying by processing circuitry a sequence of one or more instructions in the set of instructions that would produce the same result for plural execution threads were those plural execution threads each to execute the sequence of one or more instructions using the same input data; and associating by processing circuitry with at least one instruction in the identified sequence of one or more instructions an indication that the instruction belongs to a sequence of one or more instructions that would produce the same result for plural execution threads were those plural threads each to execute the sequence of one or more instructions using the same input data;

the method further comprising:

the programmable processing stage:

receiving the set of instructions for execution by the programmable processing stage; and executing the set of instructions for plural execution threads;

the executing the set of instructions for an execution thread comprising:

determining whether an instruction of the set of instructions has associated with it an indication that it belongs to a sequence of one or more instructions that would produce the same result for plural threads were those plural threads each to execute the sequence of one or more instructions using the same input data; and when it is determined that an instruction has associated with it an indication that it belongs to a sequence of one or more instructions that would produce the same result for plural threads were those plural threads each to execute the sequence of one or more instructions using the same input data:

determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and when it is determined that a result produced by an earlier execution of a section of the sequence of instructions, and that used the same input data as the input data which is intended be used when executing the sequence of instructions for the current execution thread, is stored in memory:

not executing the section of the sequence of instructions for which the result is stored for the current thread, and instead retrieving the stored result produced by the earlier execution of that section of the sequence of instructions and continuing execution of the set of instructions for the current thread after the section of the sequence of instructions for which the result is stored using the retrieved stored result.

2. The method of claim 1, further comprising the programmable processing stage:

when it is determined that an instruction does not have associated with it an indication that the instruction belongs to a sequence of one or more instructions that would produce the same result for plural threads were those plural threads each to execute the sequence of one or more instructions using the same input data:

executing the instruction for the current thread.

3. The method of claim 1, comprising associating by processing circuitry a first indication with the first instruction in the identified sequence of instructions to indicate the beginning of the identified sequence of instructions, and associating by processing circuitry a second indication with the final instruction in the identified sequence of instructions to indicate the end of the identified sequence of instructions.

4. The method of claim 1, wherein the section of the sequence of instructions for which a result is stored comprises a subset of some but not all of the instructions in the sequence of instructions.

5. The method of claim 1, further comprising the programmable processing stage:

when it is other than determined that a result produced by the earlier execution of a section of the sequence of instructions, and that used the same input data as the input data which is intended to be used when executing the sequence of instructions for the current execution thread, is stored in memory:

executing the sequence of instructions for the current thread.

6. The method of claim 1, wherein the programmable processing stage determines whether a result produced by an earlier execution of a section of the sequence of instructions to which the instruction belongs, and that used the same input data as that which is to be used when executing the sequence of instructions for the current thread, is stored in memory, by:

determining whether an identifier for the sequence of instructions to be executed by the current thread matches an identifier that is associated with an instruction sequence result stored in the memory; and determining whether the input data that is to be used when executing the instruction sequence for the current thread is the same as input data that is stored in association with the stored instruction sequence result having the matching identifier.

7. The method of claim 1, further comprising:

the programmable processing stage, when a result produced by an earlier execution of a section of a sequence of instructions to which an instruction belongs and that used the same input data as that which is to be used when executing the sequence of instructions for the current thread, is stored in memory:

also retrieving from the memory an indicator for an instruction to be executed next in the set of instructions, and continuing execution of the set of instructions for the current thread at the indicated instruction of the set of instructions.

8. The method of claim 1, further comprising:

the programmable processing stage:

when it is other than determined that a result produced by earlier execution of a section of the sequence of instructions, and that used the same input data as the input data which is intended to be used when executing the sequence of instructions for the current execution thread, is stored in memory:

executing the sequence of instructions for the current thread;

and storing the result produced by the execution of at least a section of the sequence of instructions in memory so as to be available for use by later threads that execute the same sequence of instructions.

9. The method of claim 8, comprising storing in the memory with the result of executing at least a section of a sequence of instructions, one or more of:

an identifier for the sequence of instructions that the result relates to;
an indication of the input data used when executing the sequence of instructions to generate the stored result for the sequence of instructions;
and
an indication of the next instruction to be executed when a thread is able to use the stored result for the section of the sequence of instructions.

10. The method of claim 1, comprising storing the results produced by execution of plural sequences of instructions so as to be available for use by later threads that execute the same sequences of instructions.

11. The method of claim 1, wherein the determination as to whether a result produced by an earlier execution of a section of the sequence of one or more instructions to which the instruction belongs, and that used the same input data as that which is intended to be used to execute the instruction sequence for the current thread, is stored in memory, comprises:
   determining whether an earlier thread is in the process of executing the sequence of instructions but has not yet finished executing the complete sequence of instructions; and
   when it is determined that an earlier execution thread is in the process of executing the sequence of instructions but has not yet completed its execution of the entire sequence of instructions:
      stalling the execution of the set of instructions by the current thread until the entire sequence of instructions has been executed by the earlier thread, and once the entire sequence of instructions has been executed by the earlier thread, retrieving the stored result produced by the execution of the entire sequence of instructions by the earlier thread and continuing execution of the set of instructions for the current thread after the sequence of instructions for which the result is stored, using the retrieved stored result.

12. A data processing system, comprising:
   a programmable processing stage comprising programmable processing circuitry that executes sets of instructions to perform processing operations, in which execution threads can each execute a set of instructions;
   the data processing system further comprising:
   compiling circuitry configured to, for a program comprising a set of instructions for execution by the programmable processing stage of the data processing system:
      identify a sequence of one or more instructions in the set of instructions that would produce the same result for plural execution threads were those plural execution threads each to execute the sequence of one or more instructions using the same input data; and
      associate with at least one instruction in the identified sequence of one or more instructions an indication that the instruction belongs to a sequence of one or more instructions that would produce the same result for plural execution threads were those plural threads each to execute the sequence of one or more instructions using the same input data;
   and the programmable processing stage further comprising instruction executing control circuitry configured to:
   receive the set of instructions for execution by the programmable processing stage; and
   to control the executing of the set of instructions for plural execution threads by the programmable processing circuitry of the programmable processing stage;
   the controlling of the executing of the set of instructions for an execution thread comprising:
      determining whether an instruction of the set of instructions has associated with it an indication that it belongs to a sequence of one or more instructions that would produce the same result for plural threads were those plural threads each to execute the sequence of one or more instructions using the same input data; and
      when it is determined that an instruction has associated with it an indication that it belongs to a sequence of one or more instructions that would produce the same result for plural threads were those plural threads each to execute the sequence of one or more instructions using the same input data:
         determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and
            when it is determined that a result produced by an earlier execution of a section of the sequence of instructions, and that used the same input data as the input data which is intended be used when executing the sequence of instructions for the current execution thread, is stored in memory:
               causing the programmable processing circuitry of the programmable processing stage to not execute the section of the sequence of instructions for which the result is stored for the current thread, and instead retrieve the stored result produced by the earlier execution of that section of the sequence of instructions and causing the programmable processing circuitry of the programmable processing stage to continue execution of the set of instructions for the current thread after the section of the sequence of instructions for which the result is stored using the retrieved stored result; and
            when it is other than determined that a result produced by an earlier execution of a section of the sequence of instructions, and that used the same input data as the input data which is intended be used when executing the sequence of instructions for the current execution thread, is stored in memory:
               causing the programmable processing circuitry of the programmable processing stage to execute the sequence of instructions for the current thread and store the result produced by the execution of at least a section of the sequence of instructions in memory so as to be available for use by later threads that execute the same sequence of instructions.

13. The system of claim 12, wherein the instruction executing control circuitry of the programmable processing stage is further configured to:
   when it is determined that an instruction does not have associated with it an indication that the instruction belongs to a sequence of one or more instructions that would produce the same result for plural threads were those plural threads each to execute the sequence of one or more instructions using the same input data:
cause the programmable processing circuitry of the programmable processing stage to execute the instruction for the current thread.

14. The system of claim 12, wherein the compiling circuitry of the data processing system is configured to associate a first indication with a first instruction in an identified sequence of instructions to indicate the beginning of the identified sequence of instructions, and associate a second indication with a final instruction in the identified sequence of instructions to indicate the end of the identified sequence of instructions.

15. The system of claim 12, wherein the instruction executing control circuitry of the programmable processing stage is further configured to:
when it is other than determined that a result produced by the earlier execution of a section of the sequence of instructions, and that used the same input data as the input data which is intended to be used when executing the sequence of instructions for the current execution thread, is stored in memory:
cause the programmable processing circuitry of the programmable processing stage to execute the sequence of instructions for the current thread.

16. The system of claim 12, wherein the instruction executing control circuitry of the programmable processing stage is further configured to:
determine whether a result produced by an earlier execution of a section of the sequence of instructions to which the instruction belongs, and that used the same input data as that which is to be used when executing the sequence of instructions for the current thread, is stored in memory, by:
determining whether an identifier for the sequence of instructions to be executed by the current thread matches an identifier that is associated with an instruction sequence result stored in the memory; and
determining whether the input data that is to be used when executing the instruction sequence for the current thread is the same as input data that is stored in association with the stored instruction sequence result having the matching identifier.

17. The system of claim 12, wherein the instruction executing control circuitry of the programmable processing stage is further configured to:
when a result produced by an earlier execution of a section of a sequence of instructions to which an instruction belongs and that used the same input data as that which is to be used when executing the sequence of instructions for the current thread, is stored in memory;
cause the programmable processing circuitry of the programmable processing stage to also retrieve from the memory an indicator for an instruction to be executed next in the set of instructions, and to continue execution of the set of instructions for the current thread at the indicated instruction of the set of instructions.

18. The system of claim 12, wherein the instruction executing control circuitry of the programmable processing stage is further configured to:
cause the programmable processing circuitry of the programmable processing stage to store the results produced by execution of plural sequences of instructions so as to be available for use by later threads that execute the same sequences of instructions.

19. The system of claim 12, wherein the instruction executing control circuitry of the programmable processing stage is further configured to:
cause the programmable processing circuitry of the programmable processing stage to store in the memory with the result of executing at least a section of a sequence of instructions, one or more of:
an identifier for the sequence of instructions that the result relates to;
an indication of the input data used when executing the sequence of instructions to generate the stored result for the sequence of instructions;
and
an indication of the next instruction to be executed when a thread is able to use the stored result for the section of the sequence of instructions.

20. The system of claim 12, wherein the instruction executing control circuitry of the programmable processing stage is further configured to, when determining whether a result produced by an earlier execution of a section of the sequence of one or more instructions to which the instruction belongs, and that used the same input data as that which is intended to be used to execute the instruction sequence for the current thread, is stored in memory:
determine whether an earlier thread is in the process of executing the sequence of instructions but has not yet finished executing the complete sequence of instructions; and
when it is determined that an earlier execution thread is in the process of executing the sequence of instructions but has not yet completed its execution of the entire sequence of instructions:
cause the programmable processing circuitry of the programmable processing stage to stall the execution of the set of instructions by the current thread until the entire sequence of instructions has been executed by the earlier thread, and to, once the entire sequence of instructions has been executed by the earlier thread, retrieve the stored result produced by the execution of the entire sequence of instructions by the earlier thread, and to continue execution of the set of instructions for the current thread after the sequence of instructions for which the result is stored, using the retrieved stored result.

21. A programmable processing stage for a data processing system, the programmable processing stage comprising instruction executing control circuitry configured to:
receive a set of instructions for execution by the programmable processing stage; and
to control the executing of the set of instructions for plural execution threads by the programmable processing circuitry of the programmable processing stage;
the controlling the executing of the set of instructions for an execution thread comprising:
determining whether an instruction of the set of instructions has associated with it an indication that it belongs to a sequence of one or more instructions that would produce the same result for plural threads were those plural threads each to execute the sequence of one or more instructions using the same input data; and
when it is determined that an instruction has associated with it an indication that it belongs to a sequence of one or more instructions that would produce the same result for plural threads were those plural threads each to execute the sequence of one or more instructions using the same input data:

determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and when it is determined that a result produced by an earlier execution of a section of the sequence of instructions, and that used the same input data as the input data which is intended be used when executing the sequence of instructions for the current execution thread, is stored in memory:

causing the programmable processing circuitry of the programmable processing stage to not execute the section of the sequence of instructions for which the result is stored for the current thread, and instead retrieve the stored result produced by the earlier execution of that section of the sequence of instructions and causing the programmable processing circuitry of the programmable processing stage to continue execution of the set of instructions for the current thread after the section of the sequence of instructions for which the result is stored using the retrieved stored result;

when it is other than determined that a result produced by an earlier execution of a section of the sequence of instructions, and that used the same input data as the input data which is intended be used when executing the sequence of instructions for the current execution thread, is stored in memory:

causing the programmable processing circuitry of the programmable processing stage to execute the sequence of instructions for the current thread and store the result produced by the execution of at least a section of the sequence of instructions in memory so as to be available for use by later threads that execute the same sequence of instructions.

22. A non-transitory computer readable storage medium storing computer software code which when executing on at least one processor performs a method of compiling a program to generate instructions for a programmable processing stage of a data processing system that executes sets of instructions to perform processing operations, and in which execution threads can each execute a set of instructions;

the method comprising:

for a program comprising a set of instructions for execution by the programmable processing stage of the data processing system:

identifying by processing circuitry a sequence of one or more instructions in the set of instructions that would produce the same result for plural execution threads were those plural execution threads each to execute the sequence of one or more instructions using the same input data; and associating by processing circuitry with at least one instruction in the identified sequence of one or more instructions an indication that the instruction belongs to a sequence of one or more instructions that would produce the same result for plural execution threads were those plural threads each to execute the sequence of one or more instructions using the same input data.

23. A non-transitory computer readable storage medium storing computer software code which when executing on at least one processor performs a method of operating a data processing system which includes a programmable processing stage that executes sets of instructions to perform processing operations, and in which plural execution threads may each execute a same set of instructions;

the method comprising:

for a program comprising a set of instructions for execution by the programmable processing stage of the data processing system:

identifying by processing circuitry a sequence of one or more instructions in the set of instructions that would produce the same result for plural execution threads were those plural execution threads each to execute the sequence of one or more instructions using the same input data; and associating by processing circuitry with at least one instruction in the identified sequence of one or more instructions an indication that the instruction belongs to a sequence of one or more instructions that would produce the same result for plural execution threads were those plural threads each to execute the sequence of one or more instructions using the same input data;

the method further comprising:

the programmable processing stage:

receiving the set of instructions for execution by the programmable processing stage; and executing the set of instructions for plural execution threads;

the executing the set of instructions for an execution thread comprising:

determining whether an instruction of the set of instructions has associated with it an indication that it belongs to a sequence of one or more instructions that would produce the same result for plural threads were those plural threads each to execute the sequence of one or more instructions using the same input data; and when it is determined that an instruction has associated with it an indication that it belongs to a sequence of one or more instructions that would produce the same result for plural threads were those plural threads each to execute the sequence of one or more instructions using the same input data:

determining whether a result produced by an earlier execution by a previous execution thread of a section of the sequence of instructions to which the instruction belongs, and that used the same input data as the input data which is intended to be used when executing the sequence of instructions for the current execution thread, is stored in memory; and when it is determined that a result produced by an earlier execution of a section of the sequence of instructions, and that used the same input data as the input data which is intended be used when executing the sequence of instructions for the current execution thread, is stored in memory:

not executing the section of the sequence of instructions for which the result is stored for the current thread, and instead retrieving the stored result produced by the earlier execution of that section of the sequence of instructions and continuing execution of the set of instructions for the current thread after the section of the sequence of instructions for which the result is stored using the retrieved stored result.

* * * * *